United States Patent
Sakamoto et al.

(10) Patent No.: US 12,025,882 B2
(45) Date of Patent: Jul. 2, 2024

(54) FILM FOR WAVELENGTH CONVERSION SHEET, AND WAVELENGTH CONVERSION SHEET, BACKLIGHT, AND LIQUID CRYSTAL DISPLAY DEVICE WHICH USE SAME

(71) Applicant: DAI NIPPON PRINTING CO., LTD., Tokyo (JP)

(72) Inventors: Takeshi Sakamoto, Fujimino (JP); Ryutaro Harada, Tokyo (JP); Shuichi Tamura, Misato (JP); Akihito Haruki, Saitama (JP); Shota Yamanishi, Nagareyama (JP); Yuko Fujioka, Matsudo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 18/256,187

(22) PCT Filed: Mar. 17, 2022

(86) PCT No.: PCT/JP2022/012205
§ 371 (c)(1),
(2) Date: Jun. 6, 2023

(87) PCT Pub. No.: WO2022/196756
PCT Pub. Date: Sep. 22, 2022

(65) Prior Publication Data
US 2024/0126121 A1    Apr. 18, 2024

(30) Foreign Application Priority Data

Mar. 18, 2021 (JP) .................................. 2021-044891
Jan. 7, 2022 (JP) .................................. 2022-001831

(51) Int. Cl.
*G02F 1/13357* (2006.01)
*B32B 27/08* (2006.01)
(Continued)

(52) U.S. Cl.
CPC ........ *G02F 1/133617* (2013.01); *B32B 27/08* (2013.01); *B32B 27/36* (2013.01);
(Continued)

(58) Field of Classification Search
CPC .......... B32B 2307/418; B32B 2255/26; B32B 2307/7246; G02F 1/133617; G02F 1/133606
See application file for complete search history.

(56) References Cited

U.S. PATENT DOCUMENTS

2014/0030507 A1   1/2014   Yoshida et al.
2014/0184994 A1   7/2014   Kuroda et al.
(Continued)

FOREIGN PATENT DOCUMENTS

EP    3 970 969    3/2022
JP    2015-018131    1/2015
(Continued)

OTHER PUBLICATIONS

International Search Report issued in International Application No. PCT/JP2022/012205, Jun. 14, 2022, 7 pages w/ translation.
(Continued)

*Primary Examiner* — Mariam Qureshi
(74) *Attorney, Agent, or Firm* — HSML P.C.

(57) ABSTRACT

Provided is a film for a wavelength conversion sheet that can suppress a change in color with time when applied to a wavelength conversion sheet. A film for a wavelength conversion sheet, comprising a primer layer and a first base material film in presented order, wherein a refractive index of the primer layer is defined as $n_1$, a thickness of the primer (Continued)

layer is defined as $t_1$, and a refractive index of the first base material film is defined as $n_2$, and the following condition 1 or the following condition 2 is satisfied: Condition 1: $n_1 < n_2$, and $d_1$ represented by the following expression 1 represents a range of $x \pm 0.10$ wherein x is an odd integer; Condition 2: $n_1 > n_2$, and $d_1$ represented by the following expression 1 represents a range of $x \pm 0.10$ wherein x is an even integer; Expression 1: $d_1 = n_1 \times t_1 / 112.5$ nm.

19 Claims, 5 Drawing Sheets

(51) Int. Cl.
| | | |
|---|---|---|
| *B32B 27/36* | (2006.01) | |
| *C09D 5/00* | (2006.01) | |
| *C09D 5/22* | (2006.01) | |
| *C09D 7/40* | (2018.01) | |
| *C09D 7/62* | (2018.01) | |
| *C09D 135/02* | (2006.01) | |
| *C09D 175/06* | (2006.01) | |
| *B82Y 20/00* | (2011.01) | |
| *F21V 8/00* | (2006.01) | |

(52) U.S. Cl.
CPC ............... *C09D 5/002* (2013.01); *C09D 5/22* (2013.01); *C09D 7/62* (2018.01); *C09D 7/67* (2018.01); *C09D 135/02* (2013.01); *C09D 175/06* (2013.01); *B32B 2250/02* (2013.01); *B32B 2250/244* (2013.01); *B32B 2255/10* (2013.01); *B32B 2255/20* (2013.01); *B32B 2255/26* (2013.01); *B32B 2255/28* (2013.01); *B32B 2307/418* (2013.01); *B32B 2307/518* (2013.01); *B32B 2307/7246* (2013.01); *B32B 2457/202* (2013.01); *B82Y 20/00* (2013.01); *G02B 6/0035* (2013.01); *G02F 1/133606* (2013.01)

(56) References Cited

U.S. PATENT DOCUMENTS

| | | | |
|---|---|---|---|
| 2015/0303398 A1* | 10/2015 | Il ........................... | H10K 30/82 |
| | | | 428/141 |
| 2015/0368553 A1 | 12/2015 | Nelson et al. | |
| 2020/0073171 A1 | 5/2020 | Park | |
| 2021/0301097 A1 | 9/2021 | Murata et al. | |
| 2022/0003912 A1* | 1/2022 | Jung ................ | G02F 1/133528 |
| 2023/0104432 A1 | 4/2023 | Nakajima et al. | |

FOREIGN PATENT DOCUMENTS

| | | |
|---|---|---|
| JP | 2015-069171 | 4/2015 |
| JP | 2019-101174 | 6/2019 |
| JP | 2020-019141 | 2/2020 |
| JP | 2020-160212 | 10/2020 |
| KR | 10-2018-0030121 | 3/2018 |
| KR | 10-2018-0047566 | 5/2018 |
| KR | 10-2165441 | 10/2020 |
| WO | 2012/132239 | 10/2012 |
| WO | 2013/179951 | 12/2013 |
| WO | 2020/230783 | 11/2020 |
| WO | 2022/039015 | 2/2022 |

OTHER PUBLICATIONS

Written Opinion issued in International Application No. PCT/JP2022/012205, Jun. 14, 2022, 13 pages w/translation.
Official communication issued in Korean Patent application No. 10-2023-7012359, Aug. 1, 2023, 12 pages w/ translation.

* cited by examiner

[Fig. 1]
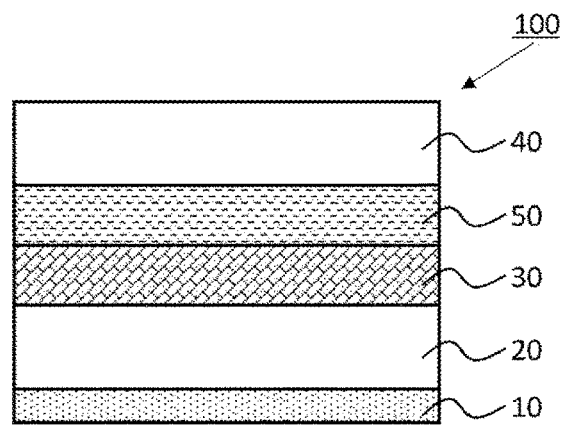
[Fig. 2]
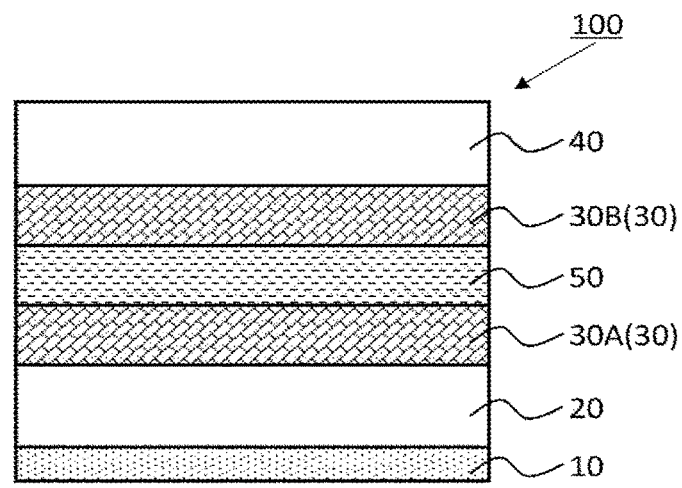
[Fig. 3]
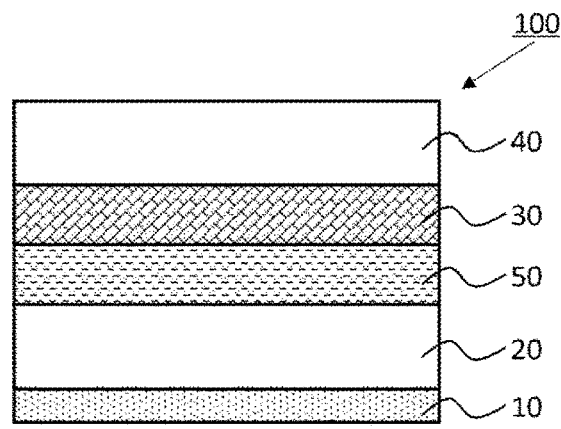

[Fig. 4]
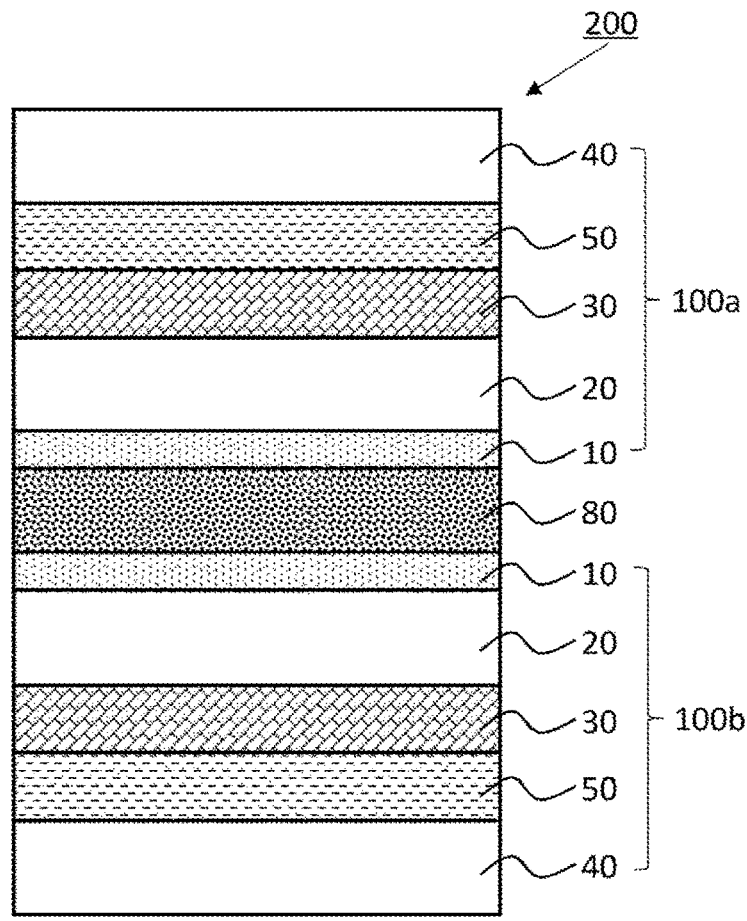
[Fig. 5]
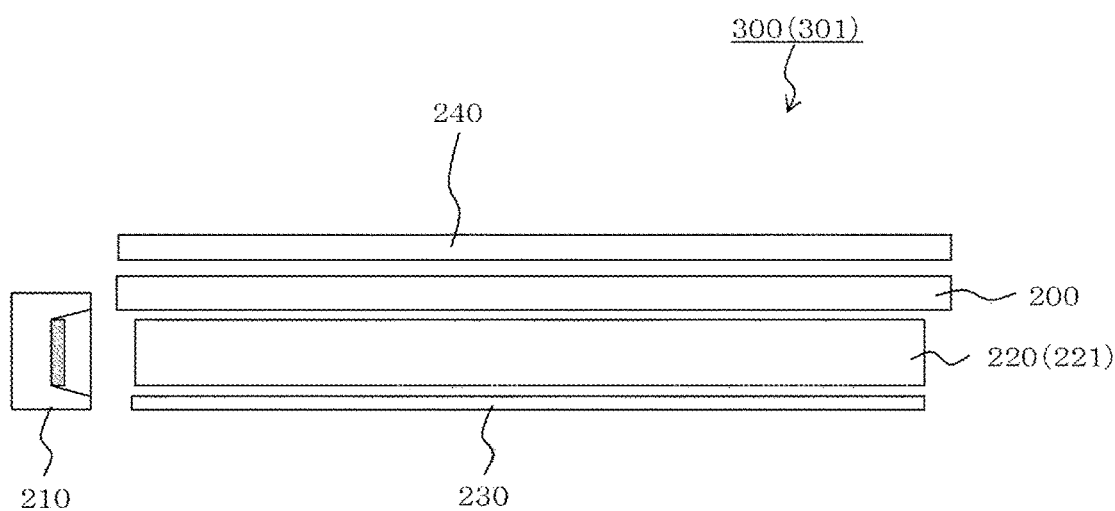

[Fig. 6]
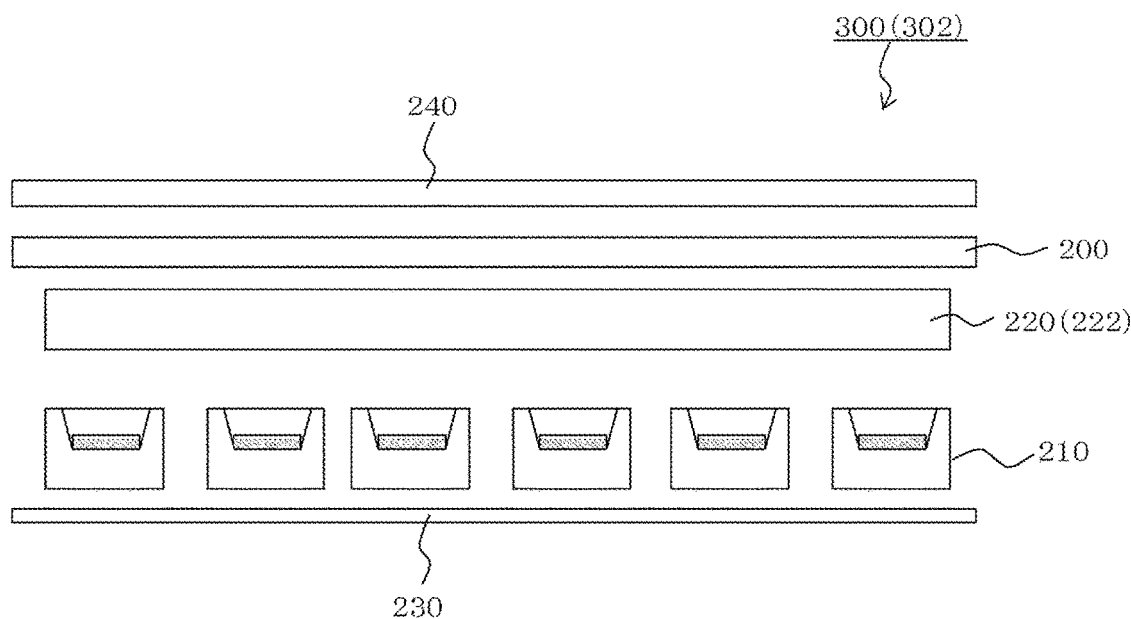
[Fig. 7]
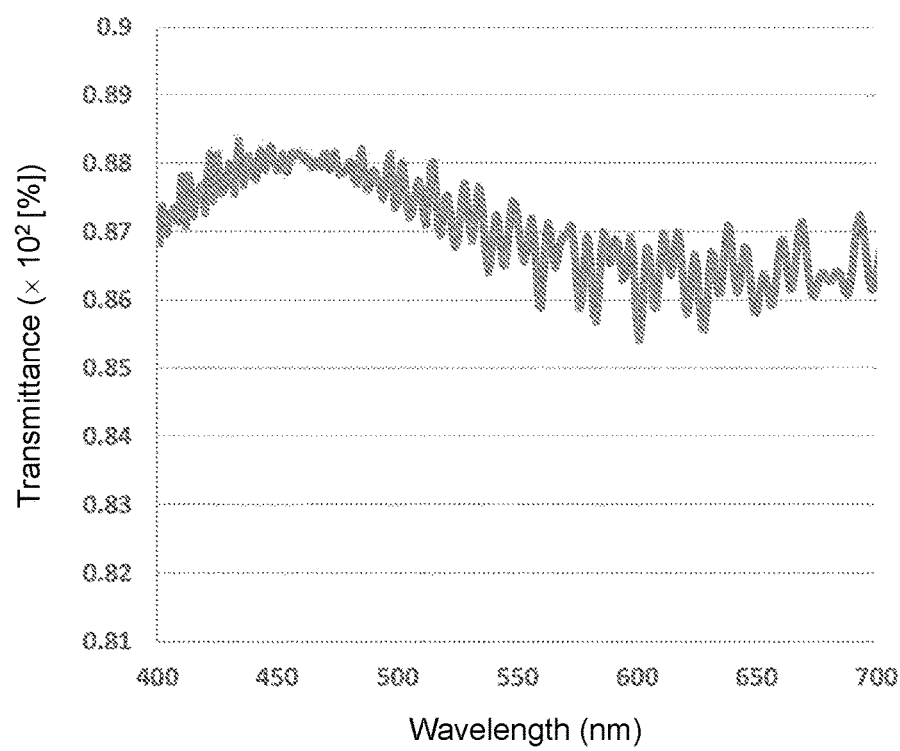

[Fig. 8]
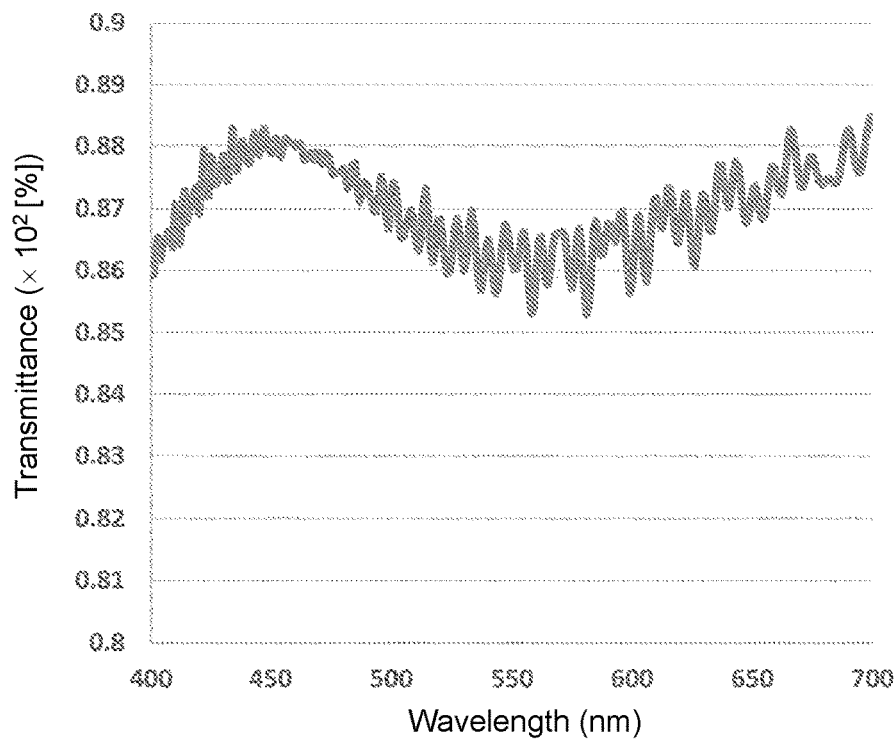
[Fig. 9]
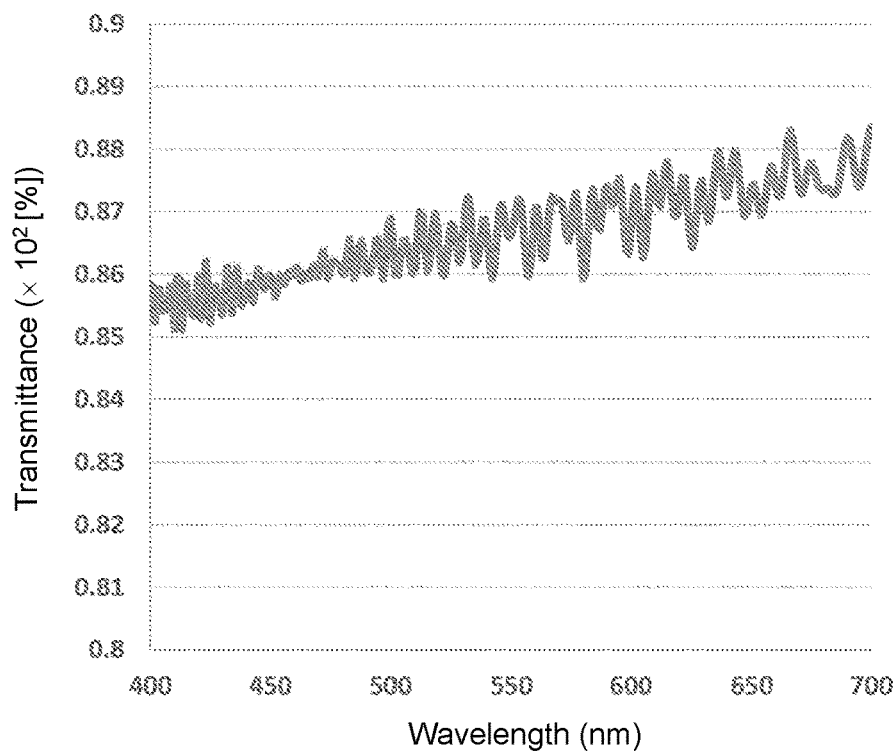

[Fig. 10]
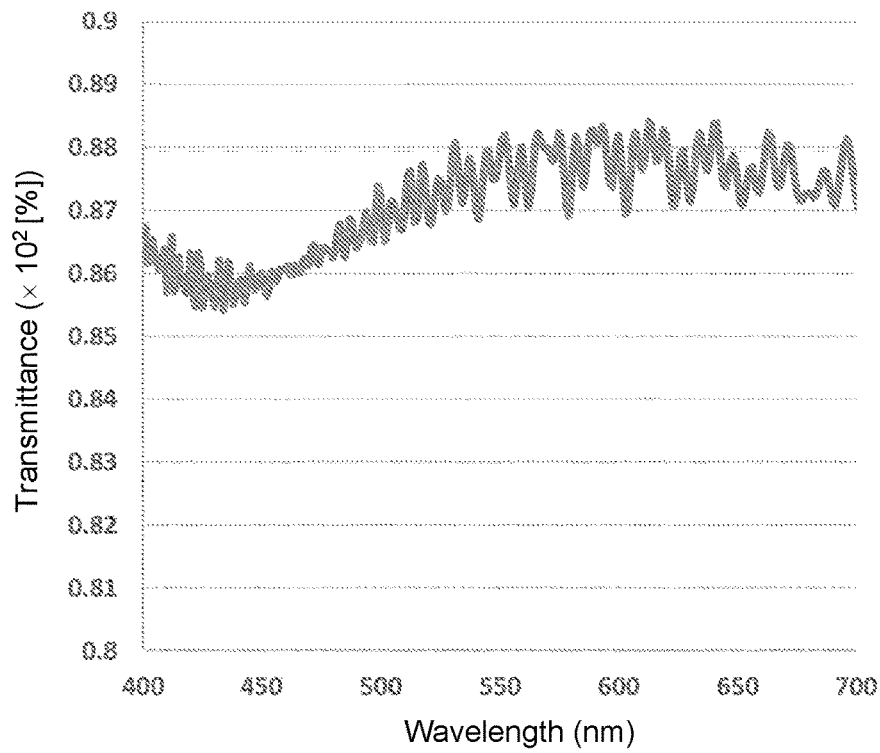
[Fig. 11]
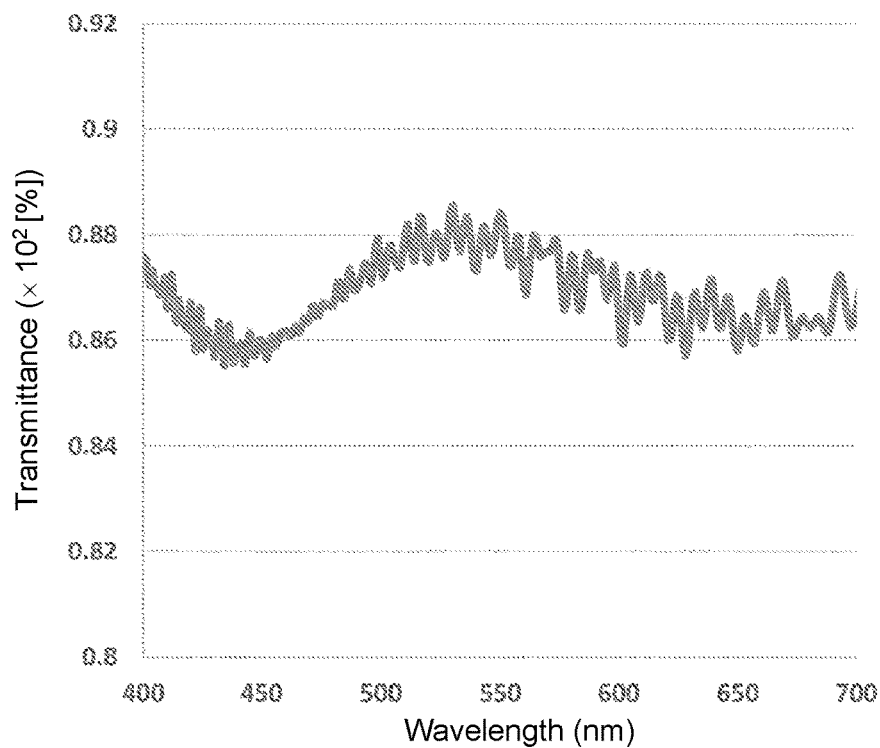

FILM FOR WAVELENGTH CONVERSION SHEET, AND WAVELENGTH CONVERSION SHEET, BACKLIGHT, AND LIQUID CRYSTAL DISPLAY DEVICE WHICH USE SAME

TECHNICAL FIELD

The present disclosure relates to a film for a wavelength conversion sheet, and a wavelength conversion sheet, a backlight, and a liquid crystal display apparatus using the barrier film.

BACKGROUND ART

With the development of a personal computer (particularly a portable personal computer), the demand for a liquid crystal display device has been increasing. In addition, recently, the penetration rate of a home-use liquid crystal display television has been increasing, and further, a smartphone and a tablet terminal have also been becoming widespread. Because of these, the present situation is that the market for a liquid crystal display apparatus is expanding further.

Such a liquid crystal display apparatus is generally configured to have a color filter, a liquid crystal cell, and a backlight, controls the intensity of light by the shutter function of the liquid crystal layer in a liquid crystal cell, and displays an image by displaying the color of each pixel by dividing the color into the three primary colors of R, G, and B using color filters.

Conventionally, a cold cathode tube (CCFL) has been used as a light source of the backlight of the liquid crystal display apparatus. However, in view of low power consumption and space saving, the light source of the backlight has been switched from the cold cathode tube to an LED.

As the LED used as a light source of a normal backlight, what is called a white LED formed by combining a blue LED and a YAG-based yellow phosphor is used. Such a white LED has a broad spectral distribution of emission wavelength and is called pseudo-white.

On the other hand, in recent years, the development of a backlight using quantum dot technology has also been promoted. The quantum dot refers to a nanometer-sized fine particle of a semiconductor.

The basic configuration of a backlight using a quantum dot is a combination of a light source that generates primary light (such as a blue LED that emits blue light) and a quantum dot.

The quantum dot is, for example, a nano-sized compound semiconductor fine particle composed of a semiconductor fine particle composed of a core which is CdSe and a shell which is ZnS, and a ligand which covers the periphery of the shell. The particle size of the quantum dot is smaller than the Bohr radius of an exciton of the compound semiconductor, and thus the quantum confinement effect appears. Because of this, the quantum dot has a higher light emission efficiency than the conventionally used phosphor using a rare earth ion as an activator (rare earth phosphor), and can realize a high light emission efficiency of 90% or more.

In addition, the emission wavelength of the quantum dot is determined by the bandgap energy of the compound semiconductor fine particle quantized as described above, and thus an arbitrary emission wavelength, that is, an arbitrary emission spectrum can be obtained by changing the particle size of the quantum dot. A backlight that combines such a quantum dot with a blue LED or the like can realize high light emission efficiency and high color purity (see, for example, Patent Literatures 1 and 2).

In addition, the quantum dot is also used for lighting, a quantum dot laser, or the like, in addition to a backlight for a liquid crystal display device.

While the quantum dot has the above excellent characteristics, a problem thereof is that the quantum dot is easily degraded by the influence of moisture, oxygen, or the like. Because of this, it is preferable to protect the surfaces of both sides of a quantum dot-containing layer with a barrier film for a wavelength conversion sheet.

Patent Literatures 3 and 4 disclose a barrier film for a wavelength conversion sheet, comprising a primer layer, a first base material film, a barrier layer, and a second base material film in presented order, and also disclose a wavelength conversion sheet in which a quantum dot-containing layer is protected by the barrier film.

CITATION LIST

Patent Literature

PTL1: WO 2012/132239
PTL2: JP 2015-18131 A
PTL3: JP 2020-19141 A
PTL4: JP 2020-160212 A

SUMMARY OF INVENTION

Technical Problem

However, there were some cases where an image having a color different from the initial one was visually recognized while the liquid crystal display apparatus using the wavelength conversion sheet of each of Patent Literatures 3 and 4 was continuously used. That is, there were some cases where the color was remarkably different when the color at the initial time point and the color at an arbitrary time point were compared in the liquid crystal display apparatus using the wavelength conversion sheet of each of Patent Literatures 3 and 4.

A quantum dot is characterized by increasing color purity. In light of this, the instability of the color of a liquid crystal display device using a quantum dot is an important problem in terms of the quality of the liquid crystal display device because the characteristic of the liquid crystal display device is impaired.

In view of the above problem, it is an object of the present disclosure to provide a film for a wavelength conversion sheet that can suppress a change in color with time when applied to a wavelength conversion sheet. In addition, it is another object of the present disclosure to provide a wavelength conversion sheet, a backlight, and a liquid crystal display device using the film for a wavelength conversion sheet.

Solution to Problem

The present inventors have carried out diligent research to achieve the above objects and as a result found that when the refractive index and the thickness of a primer layer included in a film for a wavelength conversion sheet satisfy a specific relationship, the change in color of a wavelength conversion sheet or the like to which the film for a wavelength conversion sheet is applied can be suppressed.

The present disclosure provides the following [1] to [19].

[1] A film for a wavelength conversion sheet, comprising a primer layer and a first base material film in presented order, wherein
a refractive index of the primer layer is defined as $n_1$, a thickness of the primer layer is defined as $t_1$, and a refractive index of the first base material film is defined as $n_2$, and
the following condition 1 or the following condition 2 is satisfied:
Condition 1: $n_1<n_2$, and $d_1$ represented by the following expression 1 represents a range of x±0.10 wherein x is an odd integer;
Condition 2: $n_1>n_2$, and $d_1$ represented by the following expression 1 represents a range of x±0.10 wherein x is an even integer;

$$d_1=n_1 \times t_1/112.5 \text{ nm}. \quad \text{Expression 1}$$

[2] The film for a wavelength conversion sheet according to [1], wherein the film comprises the primer layer, the first base material film, and a barrier layer in presented order.

[3] The film for a wavelength conversion sheet according to [1], wherein the film comprises the primer layer, the first base material film, a barrier layer, and a second base material film in presented order.

[4] The film for a wavelength conversion sheet according to [3], wherein the film comprises an anti-sticking layer on an opposite side of the second base material film from the barrier layer.

[5] The film for a wavelength conversion sheet according to any one of [2] to [4], wherein the barrier layer comprises an inorganic oxide layer and an organic coating layer.

[6] The film for a wavelength conversion sheet according to any one of [2] to [4], wherein the barrier layer comprises a first inorganic oxide layer, a first organic coating layer, and a second inorganic oxide layer in presented order from a side of the first base material film.

[7] The film for a wavelength conversion sheet according to any one of [2] to [4], wherein the barrier layer comprises a first inorganic oxide layer, a first organic coating layer, a second inorganic oxide layer, and a second organic coating layer in presented order from a side of the first base material film.

[8] The film for a wavelength conversion sheet according to any one of [1] to [7], wherein
in the condition 1, $d_1$ represented by the expression 1 represents a range of x±0.10 wherein x is an odd integer of 3 or more and 5 or less, and
in the condition 2, $d_1$ represented by the expression 1 represents a range of x±0.10 wherein x is an even integer of 2 or more and 4 or less.

[9] The film for a wavelength conversion sheet according to any one of [1] to [7], wherein
in the condition 1, $d_1$ represented by the expression 1 represents a range of x±0.10 wherein x is 3, and
in the condition 2, $d_1$ represented by the expression 1 represents a range of x±0.10 wherein x is 2.

[10] The film for a wavelength conversion sheet according to any one of [1] to [9], wherein the thickness of the primer layer, $t_1$, is 100 nm or more and 900 nm or less.

[11] The film for a wavelength conversion sheet according to any one of [1] to [9], wherein the thickness of the primer layer, $t_1$, is 100 nm or more and 270 nm or less.

[12] The film for a wavelength conversion sheet according to any one of [1] to [11], wherein a thickness of the first base material film is 5 μm or more.

[13] The film for a wavelength conversion sheet according to any one of [3] to [5], wherein a thickness of the second base material film is 10 μm or more and 200 μm or less.

[14] The film for a wavelength conversion sheet according to any one of [3] to [5], wherein a thickness of the second base material film is 10 μm or more and 65 μm or less.

[15] The film for a wavelength conversion sheet according to any one of [3] to [5], [13], and [14], wherein a thickness of the second base material film/a thickness of the first base material film is 2.50 or more and 6.50 or less.

[16] The film for a wavelength conversion sheet according to any one of [3] to [5], [13], and [14], wherein a thickness of the second base material film/a thickness of the first base material film is 2.50 or more and 4.20 or less.

[17] A wavelength conversion sheet comprising a first protective film, a quantum dot-containing layer comprising a quantum dot, and a second protective film laminated in presented order, wherein
the first protective film and the second protective film are each the film for a wavelength conversion sheet according to any one of [1] to [16],
the first protective film and the second protective film are laminated such that surfaces of sides of the primer layers thereof face a side of the quantum dot-containing layer, and
layers of the first protective film and the second protective film that are in contact with the quantum dot-containing layer are the primer layers, and when a refractive index of the quantum dot-containing layer is defined as $n_0$, $n_0<n_1$.

[18] A backlight comprising: at least one light source that emits primary light; an optical plate that is disposed adjacent to the light source and is for light guiding or diffusion; and a wavelength conversion sheet disposed on a light going-out side of the optical plate, wherein the wavelength conversion sheet is the wavelength conversion sheet according to [17].

[19] A liquid crystal display apparatus comprising: a backlight; and a liquid crystal panel, wherein the backlight is the backlight according to [18].

Advantageous Effect of Invention

The film for a wavelength conversion sheet, and the wavelength conversion sheet, the backlight, and the liquid crystal display device using the film for a wavelength conversion sheet according to the present disclosure can suppress a change in color with time.

BRIEF DESCRIPTION OF DRAWINGS

FIG. 1 is a cross-sectional view showing one embodiment of the film for a wavelength conversion sheet according to the present disclosure.

FIG. 2 is a cross-sectional view showing another embodiment of the film for a wavelength conversion sheet according to the present disclosure.

FIG. 3 is a cross-sectional view showing another embodiment of the film for a wavelength conversion sheet according to the present disclosure.

FIG. 4 is a cross-sectional view showing one embodiment of the wavelength conversion sheet of the present disclosure.

FIG. 5 is a cross-sectional view showing one embodiment of the backlight of the present disclosure.

FIG. 6 is a cross-sectional view showing another embodiment of the backlight of the present disclosure.

FIG. 7 is a diagram showing the spectral transmittance of the film for a wavelength conversion sheet according to Example 1.

FIG. 8 is a diagram showing the spectral transmittance of the film for a wavelength conversion sheet according to Example 2.

FIG. 9 is a diagram showing the spectral transmittance of the film for a wavelength conversion sheet according to Comparative Example 1.

FIG. 10 is a diagram showing the spectral transmittance of the film for a wavelength conversion sheet according to Comparative Example 2.

FIG. 11 is a diagram showing the spectral transmittance of the film for a wavelength conversion sheet according to Comparative Example 3.

DESCRIPTION OF EMBODIMENTS

Hereinafter, embodiments of the present disclosure will be described.

As used herein, the refractive index of each layer means the refractive index at a wavelength of 632.8 nm. The refractive index of each layer can be calculated, for example, by fitting a reflection spectrum measured by a reflection photometer and a reflection spectrum calculated from an optical model of a multilayer thin film using a Fresnel coefficient.

[Film for Wavelength Conversion Sheet]

The film for a wavelength conversion sheet according to the present disclosure is a film for a wavelength conversion sheet, comprising a primer layer and a first base material film in presented order, wherein a refractive index of the primer layer is defined as $n_1$, a thickness of the primer layer is defined as $t_1$, and a refractive index of the first base material film is defined as $n_2$, and the following condition 1 or the following condition 2 is satisfied:

Condition 1: $n_1 < n_2$, and $d_1$ represented by the following expression 1 represents a range of x±0.10 wherein x is an odd integer;

Condition 2: $n_1 > n_2$, and $d_1$ represented by the following expression 1 represents a range of x±0.10 wherein x is an even integer;

$$d_1 = n_1 \times t_1 / 112.5 \text{ nm.} \quad \text{Expression 1}$$

FIG. 1 to FIG. 3 are each a cross-sectional view showing an embodiment of a film 100 for a wavelength conversion sheet according to the present disclosure. The film 100 for a wavelength conversion sheet shown in each of FIG. 1 to FIG. 3 has a primer layer 10 and a first base material film 20 in presented order. Further, the film 100 for a wavelength conversion sheet shown in each of FIG. 1 to FIG. 3 has the primer layer 10, the first base material film 20, a barrier layer 30, and a second base material film 40 in presented order.

The film 100 for a wavelength conversion sheet shown in FIG. 2 has a first barrier layer 30A and a second barrier layer 30B as the barrier layers 30.

The film 100 for a wavelength conversion sheet shown in each of FIG. 1 to FIG. 3 has an adhesive layer 50 between the first base material film 20 and the second base material film 40.

<Laminated Configuration>

Examples of the laminated configuration of the film for a wavelength conversion sheet according to the present disclosure include the following (1) to (6). Among the following (1) to (6), (1) to (4) and (6), which easily improve the barrier property, are preferable. In addition, among (1) to (4) and (6), (1), (2), and (6), which each have a barrier layer at a position close to a quantum dot-containing layer, are more preferable. (5) and (6) are preferable because these do not have a second base material film and can simplify the laminated configuration. The laminated configuration of the film for a wavelength conversion sheet according to the present disclosure is not limited to the following (1) to (6). For example, the films for a wavelength conversion sheet according to the following (1) to (4) may have an anti-sticking layer on an opposite side of the second base material film from the barrier layer.

(1) A laminated configuration having a primer layer, a first base material film, a barrier layer, and a second base material film in presented order.

(2) A laminated configuration having a primer layer, a first base material film, a barrier layer, an adhesive layer, and a second base material film in presented order.

(3) A laminated configuration having a primer layer, a first base material film, an adhesive layer, a barrier layer, and a second base material film in presented order.

(4) A laminated configuration having a primer layer, a first base material film, a first barrier layer, an adhesive layer, a second barrier layer, and a second base material film in presented order.

(5) A laminated configuration having a primer layer and a first base material film in presented order.

(6) A laminated configuration having a primer layer, a first base material film, and a barrier layer in presented order.

<Primer Layer>

For the position in the film for a wavelength conversion sheet according to the present disclosure, the primer layer is preferably the outermost layer of the film for a wavelength conversion sheet. Having the primer layer as the outermost layer is preferable in that the close adhesion between the film for a wavelength conversion sheet and the quantum dot-containing layer can be improved. For the position when the film for a wavelength conversion sheet has a barrier layer, the primer layer is preferably the outermost layer on an opposite side of the first base material film from the barrier layer.

The primer layer preferably includes a resin component. Examples of the resin component include a polyester-based resin, a polyurethane-based resin, and an acrylic-based resin. Among these, a polyurethane-based resin is preferable. That is, the primer layer preferably includes a polyurethane-based resin.

The polyurethane-based resin can easily improve the close adhesion to the quantum dot-containing layer. In addition, the polyurethane-based resin can relax the stress generated when the quantum dot-containing layer is ionizing radiation-cured or heat-cured, to make it difficult for the stress to be transmitted to the first base material film.

Examples of the polyurethane-based resin include a reaction product of a one-pack or two-pack polyurethane-based resin composition obtained by reacting a polyfunctional isocyanate with a hydroxyl group-containing compound.

Only one of each of the polyfunctional isocyanate and the hydroxyl group-containing compound may be used, or a plurality of each thereof may be used.

Specific examples of the polyfunctional isocyanate include an aromatic polyisocyanate such as tolylene diisocyanate, diphenylmethane diisocyanate, xylylene diisocyanate, or polymethylene polyphenylene polyisocyanate, and an aliphatic polyisocyanate such as hexamethylene diisocyanate or isophorone diisocyanate.

Examples of the hydroxyl group-containing compound include a polyether polyol, a polyester polyol, a polyester polyurethane polyol, and a polyacrylate polyol. In the present disclosure, a polyester polyurethane polyol is particularly preferable in view of close adhesion to the quantum dot-containing layer and durability. The polyester polyurethane polyol can be produced, for example, by the method described in JP 2001-288408 A or JP 2003-26996 A.

The content of the polyurethane-based resin is preferably 40% by mass or more, and more preferably 70% by mass or more based on the total amount of the primer layer.

In order to suppress polymerization shrinkage, the primer layer is preferably substantially free of a resin having a group having a reactive carbon-carbon double bond as a resin component. Examples of the group having a reactive carbon-carbon double bond include an acryloyl group, a methacryloyl group, and a styryl group.

The term "substantially free of" means 1% by mass or less, more preferably 0.1% by mass or less, and further preferably 0.01% by mass or less, of the total amount of the resin component of the primer layer.

The primer layer may further contain a silane coupling agent. The silane coupling agent has a functional group, such as a chloro group, an alkoxy group, or an acetoxy group, present at one end of the molecule thereof, and the functional group is hydrolyzed to form a silanol group (Si—OH), whereby the resin composition of the primer layer is modified by a covalent bond or the like to form a strong bond. In addition, an organic functional group, such as a vinyl group, a methacryloxy group, an amino group, an epoxy group, or a mercapto group, present at the other end of the silane coupling agent can easily improve the close adhesion between the primer layer and the quantum dot-containing layer.

Examples of the silane coupling agent include γ-chloropropyltrimethoxysilane, vinyltrichlorosilane, vinyltriethoxysilane, vinyl-tris(P-methoxyethoxy)silane, γ-methacryloxypropyltrimethoxysilane, β-(3,4-epoxycyclohexyl)ethyltrimethoxysilane, γ-glycidoxypropyltrimethoxysilane, vinyltriacetoxysilane, γ-mercaptopropyltrimethoxysilane, N-β(aminoethyl)-γ-aminopropyltrimethoxysilane, N-β(aminoethyl)-γ-aminopropylmethyldimethoxysilane, γ-ureidopropyltriethoxysilane, bis(β-hydroxyethyl)-γ-aminopropyltriethoxysilane, and γ-aminopropylsilicone, and one or two or more thereof can be used.

The content of the silane coupling agent is preferably 1% by mass or more, and more preferably 3% by mass or more based on the total amount of the primer layer. When the content of the silane coupling agent is in the above range, the close adhesion between the primer layer and the quantum dot-containing layer can be easily further improved.

For improving the extensibility of the primer layer and suppressing the occurrence of a crack in the primer layer, the content of the silane coupling agent is preferably 30% by mass or less, and more preferably 20% by mass or less based on the total amount of the primer layer.

The primer layer may further include a filler. The filler has the role of adjusting the viscosity or the like of a coating liquid for forming a primer layer to improve the coating suitability or the like. As the filler, for example, calcium carbonate, barium sulfate, alumina white, silica, talc, a glass frit, or a resin powder can be used.

The primer layer may further include an additive such as a stabilizer, a crosslinking agent, a lubricant, or an ultraviolet absorber, as necessary.

The refractive index $n_1$ of the primer layer is not limited as long as condition 1 or condition 2 is satisfied, and is preferably in the following range.

$n_1$ is preferably 1.47 or more, more preferably 1.52 or more, and further preferably 1.55 or more. By setting $n_1$ to 1.47 or more, the refractive index of the primer layer can be easily made larger than the refractive index of the quantum dot-containing layer.

$n_1$ is preferably 1.66 or less, more preferably 1.62 or less, and further preferably 1.60 or less.

The thickness $t_1$ of the primer layer is not limited as long as condition 1 or condition 2 is satisfied. If the thickness $t_1$ is too small, the close adhesion between the primer layer and the quantum dot-containing layer may decrease, or the stress of the quantum dot-containing layer may fail to be sufficiently relaxed. If the thickness $t_1$ is too large, unevenness in the thickness of the primer layer is likely to occur, and a variation in a physical property is likely to occur within the plane of the primer layer.

In light of these, the thickness $t_1$ is preferably 100 nm or more, more preferably 150 nm or more, and further preferably 200 nm or more. The thickness $t_1$ is preferably 900 nm or less, more preferably 600 nm or less, further preferably 500 nm or less, and more further preferably 450 nm or less.

When a plurality of upper limit options and a plurality of lower limit options of a numerical value are indicated in a constitutional requirement shown herein, one selected from the upper limit options and one selected from the lower limit options can be combined to provide an embodiment of a numerical range.

For the thickness of the primer layer as described above, examples of the embodiment of a numerical range thereof include 100 nm or more and 900 nm or less, 100 nm or more and 600 nm or less, 100 nm or more and 500 nm or less, 100 nm or more and 450 nm or less, 150 nm or more and 900 nm or less, 150 nm or more and 600 nm or less, 150 nm or more and 500 nm or less, 150 nm or more and 450 nm or less, 200 nm or more and 900 nm or less, 200 nm or more and 600 nm or less, 200 nm or more and 500 nm or less, and 200 nm or more and 450 nm or less.

Herein, the thickness of each layer constituting the film for a wavelength conversion sheet and the thickness of the quantum dot-containing layer can be calculated, for example, by photographing a cross section using a scanning transmission electron microscope (STEM), measuring the thicknesses at 20 points from an image of the cross section, and averaging the values at the 20 points.

Herein, when measuring various parameters such as the thickness of a layer, the spectral transmittance, the total light transmittance, and the color (x value and y value in the Yxy color system), the measurement is carried out in an atmosphere having a temperature of 23° C.±5° C. and a relative humidity of 40% or more and 65% or less, unless otherwise specified. Further, a sample is exposed to the atmosphere for at least 30 minutes before measuring various parameters.

<Base Material Film>

The film for a wavelength conversion sheet according to the present disclosure has a first base material film as the base material film.

The film for a wavelength conversion sheet according to the present disclosure may have only a first base material film, or may have a first base material film and a second base material film, as the base material film. When the film for a wavelength conversion sheet has a first base material film and a second base material film, it is possible to improve the stiffness and the strength of the film for a wavelength conversion sheet while improve the efficiency of forming a barrier layer.

The first base material film and the second base material film are not particularly limited as long as these are resin films that do not impair a function of the wavelength conversion sheet.

Examples of the first base material film and the second base material film include resin films formed of one or more resins selected from the group consisting of polyester, triacetyl cellulose (TAC), cellulose diacetate, cellulose acetate butyrate, polyamide, polyimide, polyethersulfone, polysulfone, polypropylene, polymethylpentene, polyvinyl chloride, polyvinyl acetal, polyether ketone, acrylic, polycarbonate, polyurethane, an amorphous olefin (Cyclo-Olefin-Polymer: COP), and the like.

Among these resin films, a stretched polyester film is preferable, and a biaxially stretched polyester film is more preferable, in view of mechanical strength, dimensional stability, and heat resistance. Examples of the polyester film include a polyethylene terephthalate film and a polyethylene naphthalate film.

The first base material film and the second base material film may be the same resin film or different resin films.

The total light transmittance according to JIS K7361-1: 1997 of the first base material film and the second base material film are preferably 80% or more, more preferably 85% or more, and further preferably 87% or more.

A surface treatment may be applied to the surface of the side of the first base material film and the second base material film on which a barrier layer is provided, in order to improve the close adhesion or the like. Examples of the surface treatment include corona discharge treatment, ozone treatment, low temperature plasma treatment using oxygen gas, nitrogen gas, or the like, glow discharge treatment, and oxidation treatment using a chemical or the like.

It is preferable to change the thickness of the first base material film depending on the presence or absence of the second base material film. When the film for a wavelength conversion sheet has a second base material film, the thickness of the first base material film is preferably 5 μm or more, more preferably 8 μm or more, and further preferably 10 μm or more. By setting the thickness of the first base material film to 5 μm or more, the first base material film has an optical distance sufficiently larger than the wavelength of visible light, and thus the influence of the first base material film on the waveform of the spectral transmission spectrum of the film for a wavelength conversion sheet can be easily ignored.

As used herein, "optical distance"="refractive index"× "thickness." When the film for a wavelength conversion sheet has a second base material film, the thickness of the first base material film is preferably 100 μm or less, more preferably 75 μm or less, more preferably 50 μm or less, and more preferably 27 μm or less, in order to achieve thinning and make it easy to suppress invasion by water vapor and oxygen from an end portion.

On the other hand, when the film for a wavelength conversion sheet does not have a second base material film, the thickness of the first base material film is preferably 5 μm or more, more preferably 20 μm or more, more preferably 30 μm or more, more preferably 40 μm or more, and more preferably 50 μm or more. By setting the thickness of the first base material film to 5 μm or more, the first base material film has an optical distance sufficiently larger than the wavelength of visible light, and thus the influence of the first base material film on the waveform of the spectral transmission spectrum of the film for a wavelength conversion sheet can be easily ignored. Further, by setting the thickness of the first base material film to 20 μm or more, the barrier property of the film for a wavelength conversion sheet can be easily improved even when the film for a wavelength conversion sheet does not have a second base material film.

When the film for a wavelength conversion sheet does not have a second base material film, the thickness of the first base material film is preferably 200 μm or less, more preferably 150 μm or less, and more preferably 100 μm or less, in order to achieve thinning and make it easy to suppress invasion by water vapor and oxygen from an end portion.

The thickness of the second base material film is preferably 10 μm or more, more preferably 20 μm or more, and further preferably 30 μm or more. By setting the thickness of the second base material film to 10 μm or more, the handleability of the film for a wavelength conversion sheet can be easily improved.

The thickness of the second base material film is preferably 200 μm or less, more preferably 150 μm or less, more preferably 100 μm or less, more preferably 75 μm or less, more preferably 65 μm or less, and more preferably 55 μm or less for thinning.

The relationship between the thickness of the first base material film and the thickness of the second base material film is not particularly limited.

In the laminated configuration of (2) above, it is preferable to satisfy the relationship of "the thickness of the first base material film<the thickness of the second base material film." By satisfying the above relationship, it is possible to easily improve the stiffness and the strength of the film for a wavelength conversion sheet while improving the efficiency of forming a barrier layer.

For the upper limit, the ratio of the thickness of the first base material film and the thickness of the second base material film (thickness of second base material film/thickness of first base material film) is preferably 6.50 or less, more preferably 5.00 or less, and further preferably 4.20 or less, and the lower limit thereof is preferably 2.50 or more, more preferably 3.00 or more, and further preferably 3.50 or more, in order to make it easy to exhibit the effect obtained by using two base materials.

<Barrier Layer>

The film for a wavelength conversion sheet preferably has a barrier layer in order to improve the barrier property. The barrier layer is preferably positioned on an opposite side of the first base material film from the primer layer. When the film for a wavelength conversion sheet has a second base material film, the barrier layer is preferably positioned between the first base material film and the second base material film.

The barrier layer can be formed, for example, by vapor depositing, applying, or the like a component for the barrier layer on at least one of the first base material film and the second base material film.

The barrier layer may be formed on one of the first base material film and the second base material film as shown in FIG. 1 and FIG. 3. The barrier layer may be formed on both of the first base material film and the second base material film as shown in FIG. 2.

Examples of the barrier layer include a single layer of a single type selected from the group consisting of "an inorganic oxide layer formed by vapor-depositing an inorganic oxide," "an organic coating layer formed by applying a coating agent including a water-soluble polymer such as polyvinyl alcohol," and "a layer including a reaction product of a composition including a metal oxide and a phosphorus compound," a layer obtained by laminating a plurality of layers of a single type selected from the above group, and a layer obtained by laminating layers of two or more types selected from the above group. Among these, a laminate of an inorganic oxide layer and an organic coating layer is preferable. That is, the barrier layer preferably includes an inorganic oxide layer and an organic coating layer.

Examples of the layer including a reaction product of a composition including a metal oxide and a phosphorus compound include the layer disclosed in WO 2011/122036.

Hereinafter, embodiments of the inorganic oxide layer and the organic coating layer will be described.

When the barrier layer on the first base material film has an inorganic oxide layer and an organic coating layer, the film for a wavelength conversion sheet preferably has the first base material film, the inorganic oxide layer, and the organic coating layer in presented order. When the barrier layer on the second base material film has an inorganic oxide layer and an organic coating layer, the film for a wavelength conversion sheet preferably has the second base material film, the inorganic oxide layer, and the organic coating layer in presented order.

In order to improve the barrier property, the barrier layer more preferably has a first inorganic oxide layer, a first organic coating layer, and a second inorganic oxide layer in presented order, and further preferably has a first inorganic oxide layer, a first organic coating layer, a second inorganic oxide layer, and a second organic coating layer in presented order. When the barrier layer on the first base material film has the above configuration, the film for a wavelength conversion sheet preferably has the first base material film, the first inorganic oxide layer, the first organic coating layer, and the second inorganic oxide layer in presented order, and more preferably has the first base material film, the first inorganic oxide layer, the first organic coating layer, the second inorganic oxide layer, and the second organic coating layer in presented order. When the barrier layer on the second base material film has the above configuration, the film for a wavelength conversion sheet preferably has the first base material film, the first inorganic oxide layer, the first organic coating layer, and the second inorganic oxide layer in presented order, and more preferably has the second base material film, the first inorganic oxide layer, the first organic coating layer, the second inorganic oxide layer, and the second organic coating layer in presented order.

<<Inorganic Oxide Layer>>

Examples of an inorganic oxide for the inorganic oxide layer include one or more selected from aluminum oxide, silicon oxide, and magnesium oxide. Aluminum oxide or silicon oxide is preferable in view of imparting a sufficient barrier property to the film for a wavelength conversion sheet and for production efficiency of the film for a wavelength conversion sheet. Aluminum oxide is more preferable for color suppression.

The inorganic oxide layer can be formed, for example, by a physical vapor deposition method (PVD method) such as a vacuum vapor deposition method, a sputtering method, and an ion plating method, or a chemical vapor deposition method (CVD method) such as a plasma chemical vapor deposition method, a thermochemical vapor deposition method, and a photochemical vapor deposition method. Among these, a vacuum vapor deposition method is preferable in view of productivity (vapor deposition rate). The PVD method is preferable to the CVD method since carbon is less likely to be mixed into the inorganic oxide layer.

When the inorganic oxide layer includes silicon oxide, the content of silicon oxide in each layer is preferably 80% by mass or more, more preferably 90% by mass or more, and further preferably 95% by mass or more on a mass basis.

When the inorganic oxide layer includes aluminum oxide, the content of aluminum oxide in each layer is preferably 80% by mass or more, more preferably 90% by mass or more, and further preferably 95% by mass or more on a mass basis.

The preferable thickness of the inorganic oxide layer varies depending on the type of the inorganic oxide, and thus cannot be generalized. When the inorganic oxide layer includes silicon oxide or aluminum oxide, the thickness of the inorganic oxide layer is preferably in the following range.

When the inorganic oxide layer includes silicon oxide, the thickness of the inorganic oxide layer is preferably 20 nm or more, more preferably 50 nm or more, and further preferably 70 nm or more in order to improve the barrier property.

When the inorganic oxide layer includes silicon oxide, the thickness of the inorganic oxide layer is preferably 220 nm or less, more preferably 180 nm or less, more preferably 160 nm or less, more preferably 140 nm or less, and more preferably 100 nm or less. By setting the thickness to 220 nm or less, the occurrence of a scratch and a crack in the inorganic oxide layer can be easily suppressed and the color derived from silicon oxide can be easily suppressed.

When the inorganic oxide layer includes aluminum oxide, the thickness of the inorganic oxide layer is preferably 6 nm or more, and more preferably 7 nm or more in order to improve the barrier property.

When the inorganic oxide layer includes aluminum oxide, the thickness of the inorganic oxide layer is preferably 25 nm or less, more preferably 20 nm or less, more preferably 15 nm or less, more preferably 12 nm or less, and more preferably 10 nm or less. By setting the thickness to 25 nm or less, the occurrence of a scratch and a crack in the inorganic oxide layer can be easily suppressed.

An anchor layer may be provided between the inorganic oxide layer and the first base material film or the second base material film in order to improve the close adhesion or the like. In particular, when the inorganic oxide layer includes silicon oxide, it is preferable to have an anchor layer between the inorganic oxide layer and the first base material film or the second base material film.

As the anchor layer, a polyester-based resin, a polyurethane-based resin, an acrylic-based resin, a vinyl alcohol resin, an ethylene vinyl alcohol resin, a vinyl modified resin, an oxazoline group-containing resin, a carbodiimide group-containing resin, an epoxy group-containing resin, an isocyanate group-containing resin, an alkoxyl group-containing resin, a modified styrene resin, a modified silicone resin, and the like can be used singly or in combinations of two or more. The thickness of the anchor layer is preferably 0.01 µm or more and 1 µm or less.

<<Organic Coating Layer>>

The organic coating layer preferably includes one or more selected from a water-soluble polymer and a metal alkoxide-based compound. The organic coating layer includes more preferably one or more selected from the group consisting of a water-soluble polymer, and further preferably one or more selected from the group consisting of a water-soluble polymer and one or more selected from the group consisting of a metal alkoxide-based compound, among a water-soluble polymer and a metal alkoxide-based compound.

The organic coating layer has better flexibility than the inorganic oxide layer. Accordingly, by having an organic coating layer in addition to an inorganic oxide layer, the occurrence of a scratch and a crack in the inorganic oxide layer can be easily suppressed, and the barrier property of the film for a wavelength conversion sheet can be easily improved.

Examples of the water-soluble polymer include polyvinyl alcohol, polyvinylpyrrolidone, and an ethylene-vinyl alcohol copolymer, and among these, polyvinyl alcohol and an ethylene-vinyl alcohol copolymer are preferable, and polyvinyl alcohol is more preferable, in view of the barrier property. That is, the organic coating layer includes preferably one or more selected from the group consisting of polyvinyl alcohol and an ethylene-vinyl alcohol copolymer, and more preferably polyvinyl alcohol.

When the organic coating layer contains a water-soluble polymer and a metal alkoxide-based compound, the content of the water-soluble polymer is preferably 5 parts by mass or more and 500 parts by mass or less, more preferably 7 parts by mass or more and 100 parts by mass or less, and further preferably 8 parts by mass or more and 50 parts by mass or less, per 100 parts by mass in total of the metal alkoxide-based compound.

Examples of the metal alkoxide-based compound include a metal alkoxide, a metal alkoxide hydrolysate, and a metal alkoxide polymer.

The metal alkoxide is a compound represented by the general formula $M(OR)_n$. In the formula, M represents a metal such as Si, Ti, Al, and Zr, and R represents an alkyl group such as a methyl group and an ethyl group. Specific examples of the metal alkoxide include tetramethoxysilane, tetraethoxysilane, and isopropoxyaluminum.

An organic coating layer can be formed, for example, by applying a coating liquid including a component constituting the organic coating layer on the inorganic oxide layer and drying the same. The coating liquid may contain an additive such as a silane coupling agent, a curing agent, or a dispersant.

The thickness of the organic coating layer is preferably 70 nm or more, more preferably 100 nm or more, and further preferably 150 nm or more in order to improve the barrier property.

The thickness of the organic coating layer is preferably 600 nm or less, more preferably 480 nm or less, more preferably 370 nm or less, more preferably 300 nm or less, more preferably 270 nm or less, and more preferably 250 nm or less. By setting the thickness to 600 nm or less, the film for a wavelength conversion sheet can be thinned. If the thickness of the organic coating layer is too large, the stress generated when the organic coating layer is applied and dried is large, and the stress may cause a crack in the inorganic oxide layers and reduce the barrier property. Accordingly, by setting the thickness to 600 nm or less, the initial barrier property can be easily improved.

<Further Layer>

The film for a wavelength conversion sheet may have a "layer other than the primer layer, the first base material film, the barrier layer, or the second base material film (further layer)" as long as the further layer does not impair the effect of the film for a wavelength conversion sheet.

Examples of the further layer include an adhesive layer. The adhesive layer is, for example, positioned between the first base material film and the second base material film and used in order to integrate the first base material film, the barrier layer, and the second base material film.

The adhesive layer can be formed from a general-purpose adhesive composition. The thickness of the adhesive layer is preferably 3 μm or more and 100 μm or less, more preferably 3 μm or more and 50 μm or less, and further preferably 4 μm or more and 8 μm or less.

Other examples of the further layer include an anti-sticking layer. The anti-sticking layer is preferably positioned on an opposite side of the second base material film from the barrier layer, and is preferably positioned as the outermost layer on the opposite side of the second base material film from the barrier layer.

The anti-sticking layer preferably includes a filler and a binder resin.

<Condition 1 or Condition 2>

The film for a wavelength conversion sheet according to the present disclosure requires that the following condition 1 or the following condition 2 be satisfied, wherein the refractive index of the primer layer is defined as $n_1$, the thickness of the primer layer is defined as $t_1$, and the refractive index of the first base material film is defined as $n_2$.

Condition 1: $n_1 < n_2$, and $d_1$ represented by the following expression 1 represents a range of $x \pm 0.10$ wherein x is an odd integer;

Condition 2: $n_1 > n_2$, and $d_1$ represented by the following expression 1 represents a range of $x \pm 0.10$ wherein x is an even integer;

$$d_1 = n_1 \times t_1 / 112.5 \text{ nm} \qquad \text{Expression 1}$$

First, the background that has led to setting $d_1$ in expression 1 in a predetermined range by the present inventors will be described.

For example, as shown in FIG. 4, films (100a, 100b) for a wavelength conversion sheet according to the present disclosure are disposed on both sides, respectively, of a quantum dot-containing layer (80) and are used as constituent members of a wavelength conversion sheet (200). In FIG. 4, the films (100a, 100b) for a wavelength conversion sheet have a role as a protective film for the quantum dot-containing layer (80). Then, in a backlight including the wavelength conversion sheet, light going out from a primary light source of the backlight (generally, blue light having a central wavelength of 450 nm) comes in on a second base material film (40) of a lower film (100b) for a wavelength conversion sheet of the wavelength conversion sheet (200).

When the light from the primary light source comes in on the second base material film (40) of the lower film (100b) for a wavelength conversion sheet of the wavelength conversion sheet (200) in FIG. 4, most of the light penetrates the second base material film (40), an adhesive layer (50), a barrier layer (30), and a first base material film (20) and reaches the quantum dot-containing layer (80).

Then, the light from the primary light source that has reached the quantum dot-containing layer (80) and collides with a quantum dot is converted into light having a wavelength different from that of the primary light source (hereinafter, the light that collides with the quantum dot and is converted is referred to as L2) and comes in on a primer layer (10) of an upper film (100a) for a wavelength conversion sheet. Examples of L2 include green light and red light. On the other hand, the light from the primary light source that has reached the quantum dot-containing layer (50) and does not collide with the quantum dot remains the wavelength of the light from the primary light source and comes in on the primer layer (10) of the upper film (100a) for a wavelength conversion sheet. Hereinafter, the light that does not collide with the quantum dot and is not converted is referred to as L1. Examples of L1 include blue light.

Then, most of the light (L1 and L2) coming in on the upper film (100a) for a wavelength conversion sheet penetrates the primer layer (10), the first base material film (20), the barrier layer (30), the adhesive layer (50), and the second base material film (40) and is directed to a member disposed on the viewer side of the wavelength conversion sheet (200). Examples of the member disposed on the viewer side of the wavelength conversion sheet include a brightness enhancement sheet such as a prism sheet.

The color of a liquid crystal display device to which the wavelength conversion sheet including the film for a wavelength conversion sheet is applied is established by the balance between L1 and L2. Therefore, it is considered that the reason why the color of the liquid crystal display apparatus to which the wavelength conversion sheet is applied changes with time is that the balance between L1 and L2 changes.

The present inventors have diligently researched the cause of the change in the balance between L1 and L2. First, it is considered that the amount of light of L2 gradually decreases as the quantum dot degrades. However, the degradation of the quantum dot is suppressed by, for example, the film for a wavelength conversion sheet as a protective film, and thus the change in color cannot be explained only by the degradation of the quantum dot. In addition, when the primary light source degrades, not only L1 but also L2 is relatively reduced, and thus it is also unlikely that the degradation of the primary light source is the cause.

The present inventors have carried out further diligent research and as a result found that a synergistic action between the change in the transmittance of L1 through the upper film 100a for a wavelength conversion sheet (≈the change in the amount of light of L1 going out from the upper film for a wavelength conversion sheet) and the change in the amount of light of L2 due to the degradation of the quantum dot causes the change in the color of the liquid crystal display device to which the wavelength conversion sheet including the film for a wavelength conversion sheet is applied.

Then, the present inventors have found that the main cause of the change with time in the transmittance of L1 through the upper film 100a for a wavelength conversion sheet (≈the amount of light of L1 going out from the upper film 100a for a wavelength conversion sheet) is the change in the thickness of the primer layer due to humidity or the like.

Next, the technical significance of setting the refractive index and $d_1$ in expression 1 in their respective predetermined ranges will be described.

In the case of FIG. 4, L1 passes through 6 interfaces before L1 penetrates the upper film 100a for a wavelength conversion sheet. The 6 interfaces are the interface between the quantum dot-containing layer and the primer layer (interface 1), the interface between the primer layer and the first base material film (interface 2), the interface between the first base material film and the barrier layer (interface 3), the interface between the barrier layer and the adhesive layer (interface 4), the interface between the adhesive layer and the second base material film (interface 5), and the interface between the second base material film and air (interface 6).

The refractive index $n_0$ of the quantum dot-containing layer is usually smaller than the refractive index $n_1$ of the primer layer. Therefore, the reflection at interface 1 is usually fixed end reflection. The transmittance (%) of L1 is approximately "100(%)–reflectance (%)." Then, for the reflectance of L1, it is necessary to consider the interference between the reflection at interface 1 and the reflection at another interface. Specifically, when the reflection at interface 1 is reduced by the interference with the reflection at another interface, the transmittance of L1 becomes high, and conversely, when the reflection at interface 1 is increased by the interference with the reflection at another interface, the transmittance of L1 becomes low.

The thickness of the first base material film is usually designed to be sufficiently larger than the wavelength of light. Therefore, the reflections at interfaces 3 to 6 are reflections that can be ignored as so-called thin film interference. Therefore, for the interference with the reflection at interface 1, consideration may be given only to the reflection at interface 2.

Even in the films for a wavelength conversion sheet having the laminated configurations of (1) to (6) described above, it can be deemed that for the interference with the reflection at the interface between the quantum dot-containing layer and the primer layer (interface 1), consideration may be given only to the interface between the primer layer and the first base material film (interface 2).

When $n_1 < n_2$, which is the precondition of condition 1, the reflection at interface 2 is fixed end reflection. As described above, the reflection at interface 1 is usually fixed end reflection. Therefore, under condition 1, the reflections at interface 1 and interface 2 are each fixed end reflection. In this case, the reflection at interface 2 weakens the reflection at interface 1 and the reflectance is reduced when the relationship of the following expression x-1 is satisfied for light having the wavelength k. Then, the reduction of the reflectance means that the transmittance increases. Therefore, in the case of the interface reflection under condition 1, the transmittance of light having the wavelength k going out from the quantum dot-containing layer is highest when the relationship of the following expression m-1 is satisfied.

$$2 \times n_1 \times t_1 = \lambda/2 \qquad \text{(Expression x-1)}$$

Expression x-1 can be transformed into the following expression x-2.

$$n_1 \times t_1 = \lambda/4 \qquad \text{(Expression x-2)}$$

From expression x-2, in the case of the interface reflection under condition 1, it can be deemed that the transmittance at the wavelength λ is highest when "$n_1 \times t_1$"="$\lambda/4$" is satisfied. The spectral transmittance has periodicity, and thus under condition 1, it can be deemed that the transmittance at the wavelength λ is also highest when "$n_1 \times t_1$" is an odd number times "$\lambda/4$." Then, what number times "$\lambda/4$" is "$n_1 \times t_1$" can be calculated by dividing the left side of expression x-2 by the right side.

The central wavelength of the primary light of the backlight using a quantum dot is approximately 450 nm. Assuming that λ is 450 nm, "$\lambda/4$" in expression x-2 is "112.5 nm."

That is, expression 1 of the present disclosure is an expression showing what number times "112.5 nm ($\lambda/4$)" is "$n_1 \times t_1$."

Then, in the case of the interface reflection under condition 1, when $d_1$ in expression 1 is 2x+1 wherein x is an integer of 0 or more, the transmittance of light having a wavelength of 450 nm is highest, and when $d_1$ in expression 1 is 2x wherein x is an integer of 1 or more, the transmittance of light having a wavelength of 450 nm is lowest. In other words, in the case of the interface reflection under condition 1, when $d_1$ in expression 1 is an odd number, the transmittance of light having a wavelength of 450 nm shows a peak, and when $d_1$ in expression 1 is an even number, the transmittance of light having a wavelength of 450 nm shows a bottom. The light having a wavelength of 450 nm can be regarded as L1 described above.

On the other hand, when $n_1>n_2$, which is the precondition of condition 2, the reflection at interface 2 is free end reflection. As described above, the reflection at interface 1 is usually fixed end reflection. Therefore, under condition 2, the reflection at interface 1 is fixed end reflection, and the reflection at interface 2 is free end reflection. In the case of the interface reflection under condition 2, it may be considered that the peak and the bottom in the interface reflection under condition 1 are reversed.

Specifically, in the case of the interface reflection under condition 2, when $d_1$ in expression 1 is 2x wherein x is an integer of 1 or more, the transmittance of light having a wavelength of 450 nm is highest, and when $d_1$ in expression 1 is 2x+1 wherein x is an integer of 0 or more, the transmittance of light having a wavelength of 450 nm is lowest. In other words, in the case of the interface reflection under condition 2, when $d_1$ in expression 1 is an even number, the transmittance of light having a wavelength of 450 nm shows a peak, and when $d_1$ in expression 1 is an odd number, the transmittance of light having a wavelength of 450 nm shows a bottom.

From the above, in the case of the interface reflection under condition 1 (when the reflections at interfaces 1 and 2 are each fixed end reflection), it can be deemed that when $d_1$ in expression 1 is an odd number, the transmittance of light having a wavelength of 450 nm shows a peak.

On the other hand, in the case of the interface reflection under condition 2 (when the reflection at interface 1 is fixed end reflection and the reflection at interface 2 is free end reflection), it can be deemed that when $d_1$ in expression 1 is an even number, the transmittance of light having a wavelength of 450 nm shows a peak.

Condition 1 of the present disclosure requires that the value of $d_1$ in expression 1 be in the range of x±0.10 wherein x is an odd integer. Condition 2 of the present disclosure requires that the value of $d_1$ in expression 1 be in the range of x±0.10 wherein x is an even integer.

Specifically, for the film for a wavelength conversion sheet according to the present disclosure, condition 1 shows that the value of $d_1$ is in the vicinity of an odd integer, and condition 2 show that the value of $d_1$ is in the vicinity of an even integer. In other words, for the film for a wavelength conversion sheet according to the present disclosure satisfying condition 1 or condition 2, these show that the waveform of the spectral transmission spectrum of the light transmitted through the film for a wavelength conversion sheet has a peak in the vicinity of 450 nm.

As described above, the waveform of the spectral transmission spectrum of the film for a wavelength conversion sheet has a peak in the vicinity of 450 nm, and due to this, a change in color can be suppressed when the film for a wavelength conversion sheet is exposed to a high humidity environment. The reason for exhibiting such an effect is considered as follows.

First, when the film for a wavelength conversion sheet is exposed to a high humidity environment, the primer layer of the film for a wavelength conversion sheet swells. Then, when the primer layer swells, the thicknesses of the primer layer increase, and thus the waveform of the spectral transmittance of the film for a wavelength conversion sheet shifts (mainly shifts to the long wavelength side). Then, the spectral transmittance of the film for a wavelength conversion sheet tends to change little in the vicinity of the peak and the bottom, but change greatly in a region outside the peak and the bottom. In addition, the spectral transmittance tends to change little in the vicinity of each of the peak and the bottom, but when comparing the change rates of the spectral transmittance, the change rate is smaller in the vicinity of the peak than in the vicinity of the bottom. Therefore, it is considered that by setting the transmittance at a wavelength of 450 nm of the film for a wavelength conversion sheet in the vicinity of the peak, it is possible to suppress a change in the transmittance at 450 nm when the primer layer swells and the waveform of the spectral transmission spectrum shifts. The central wavelength of the primary light of the backlight using a quantum dot is approximately 450 nm, and thus it is considered that suppression of the change in the transmittance at 450 nm of the film for a wavelength conversion sheet leads to the conclusion that it is possible to suppress a change in the transmittance of the light from the primary light source that has reached the quantum dot-containing layer (80) and does not collide with the quantum dot (L1) and thus suppress a change in the color of the backlight using the quantum dot.

The wavelength region of L2 (green and red) has a longer period of the waveform of the spectral transmission spectrum than that of L1 (blue) and thus is not easily affected by the swelling of the primer layer.

FIGS. 7 and 8 are diagrams showing the spectral transmittance of the films for a wavelength conversion sheet according to Examples 1 and 2, respectively, and FIGS. 9 to 11 are diagrams showing the spectral transmittance of the films for a wavelength conversion sheet according to Comparative Examples 1 to 3, respectively. The films for a wavelength conversion sheet according to Examples 1 and 2 satisfy condition 1, but the films for a wavelength conversion sheet according to Comparative Examples 1 to 3 satisfy neither of conditions 1 and 2. From FIGS. 7 to 11, it can be seen that when condition 1 or 2 is satisfied, the spectral transmittance of the film for a wavelength conversion sheet shows a peak in the vicinity of a wavelength of 450 nm, whereas when neither of conditions 1 and 2 is satisfied, the spectral transmittance of the film for a wavelength conversion sheet does not show a peak in the vicinity of a wavelength of 450 nm.

From the above, the film for a wavelength conversion sheet according to the present disclosure can suppress a change in color under a high humidity environment by satisfying condition 1 or condition 2.

When the barrier layer has an inorganic oxide layer including silicon oxide, the b* value of the film for a wavelength conversion sheet in the L*a*b* color system tends to increase. A film having a large b* value (film having a yellowish tinge) is avoided in view of the visibility of an image display device.

As described above, the spectral transmittance of the film for a wavelength conversion sheet according to the present disclosure satisfying conditions 1 and 2 shows a peak in the vicinity of 450 nm. In other words, the film for a wavelength conversion sheet satisfying condition 1 and condition 2 has a high transmittance of blue, which is the complementary color of yellow. Therefore, the film for a wavelength conversion sheet according to the present disclosure satisfying condition 1 and condition 2 can also suppress the prominence of a yellow color derived from silicon oxide when the barrier layer has an inorganic oxide layer including silicon oxide.

Preferable Embodiment 1

In condition 1 for the film for a wavelength conversion sheet according to the present disclosure, $d_1$ represented by the above expression 1 represents preferably a range of x±0.07 wherein x is an odd integer, more preferably a range of x±0.05 wherein x is an odd integer, more preferably a range of x±0.03 wherein x is an odd integer, and more preferably a range of x±0.01 wherein x is an odd integer.

In condition 2, $d_1$ represented by the above expression 1 represents preferably a range of x±0.07 wherein x is an even integer, more preferably a range of x±0.05 wherein x is an even integer, more preferably a range of x±0.03 wherein x is an even integer, and more preferably a range of x±0.01 wherein x is an even integer.

Preferable Embodiment 2

The film for a wavelength conversion sheet according to the present disclosure requires that in condition 1, $d_1$ represented by the above expression 1 represent a range of x±0.10 wherein x is an odd integer, and that in condition 2, $d_1$ represented by the above expression 1 represent a range of x±0.10 wherein x is an even integer.

Under condition 1 and condition 2, too small $d_1$ means that the thickness of the primer layer is too small, and too large $d_1$ means that the thickness of the primer layer is too large. If the thickness of the primer layer is too small, the close adhesion between the primer layer and the quantum dot-containing layer may decrease, or the stress of the quantum dot-containing layer may fail to be sufficiently relaxed. If the thickness of the primer layer is too large, unevenness in the thickness of the primer layer is likely to occur, and a variation in a physical property is thus likely to occur within the plane of the primer layer.

In condition 1 and condition 2, if the value of $d_1$ is too large, the period of the waveform of the spectral transmittance is short, and it is thus difficult to suppress a change in color.

In light of these, in condition 1, $d_1$ represented by the above expression 1 represents preferably a range of x±0.10 wherein x is an odd integer of 3 or more and 9 or less, more preferably a range of x±0.10 wherein x is an odd integer of 3 or more and 5 or less, and further preferably a range of x±0.10 wherein x is 3.

In condition 2, $d_1$ represented by the above expression 1 represents preferably a range of x±0.10 wherein x is an even integer of 2 or more and 8 or less, more preferably a range of x±0.10 wherein x is an even integer of 2 or more and 4 or less, and further preferably a range of x±0.10 wherein x is 2.

In the above preferable embodiment 2, the portion "x±0.10" is more preferably x±0.07, more preferably x±0.05, more preferably x±0.03, and more preferably x±0.01.

Preferable Embodiment 3

In condition 1 for the film for a wavelength conversion sheet according to the present disclosure, $d_1$ represented by the above expression 1 represents preferably a range of x or more and x+0.10 or less wherein x is an odd integer, more preferably a range of x or more and x+0.10 or less wherein x is an odd integer of 3 or more and 9 or less, and further preferably a range of x or more and x+0.10 or less wherein x is an odd integer of 3 or more and 5 or less.

In condition 2, $d_1$ represented by the above expression 1 represents preferably a range of x or more and x+0.10 or less wherein x is an even integer, more preferably a range of x or more and x+0.10 or less wherein x is an odd integer of 2 or more and 8 or less, and further preferably a range of x or more and x+0.10 or less wherein x is an odd integer of 2 or more and 4 or less.

In the above preferable embodiment 3, the portion "x+0.10" is more preferably x+0.07, more preferably x+0.05, more preferably x+0.03, and more preferably x+0.01.

In preferable embodiment 3, it can be deemed that the waveform of the spectral transmission spectrum of the film for a wavelength conversion sheet has a peak in the vicinity of 450 nm. In preferable embodiment 3, $d_1$ represented by expression 1 represents a value on the positive side of an odd number or an even number, not exactly the odd number or the even number. Therefore, in the film for a wavelength conversion sheet satisfying preferable embodiment 3, the transmittance at a wavelength of 450 nm decreases, when the primer layer swells to allow the waveform of the spectral transmittance of the film for a wavelength conversion sheet to shift to the long wavelength side. That is, in preferable embodiment 3, when the primer layer swells, the transmittance of L1 decreases.

On the other hand, the amount of the light resulting from the conversion by the quantum dot (L2) gradually decreases because of the degradation of the quantum dot.

Therefore, in preferable embodiment 3, the amount of light of L2 is reduced by the degradation of the quantum dot, and the transmittance of L1 also decreases. Thus the balance between L1 and L2 is less likely to be lost, and the change in color can be further suppressed, which is preferable.

<Physical Properties>
<<Water Vapor Transmission Rate>>

The film for a wavelength conversion sheet has a value of water vapor transmission rate according to JIS K7129-2: 2019 of preferably 0.20 g/m²·day or less and more preferably 0.15 g/m²·day or less. The conditions for measuring the water vapor transmission rate are a temperature of 40° C. and a relative humidity of 90%.

The water vapor transmission rate can be measured, for example, using a water vapor transmission rate measuring apparatus (trade name: PERMATRAN) manufactured by MOCON, Inc.

<<Oxygen Transmission Rate>>

The film for a wavelength conversion sheet preferably has a value of oxygen transmission rate according to JIS K7126-2:2006 of 0.5 cc/m²·day·atm or less. The conditions for measuring the oxygen transmission rate are a temperature of 23° C. and a relative humidity of 90%.

The oxygen transmission rate can be measured, for example, using an oxygen transmission rate measuring apparatus (trade name: OX-TRAN) manufactured by MOCON, Inc (MOCON method).

<<b* Value>>

The film for a wavelength conversion sheet has a b* value in the L*a*b* color system of preferably 1.0 or less, more preferably −2.5 or more and 1.0 or less, and further preferably −2.0 or more and 0.8 or less.

The L*a*b* color system is based on the L*a*b* color system standardized by the International Commission on Illumination (CIE) in 1976 and is adopted in JIS Z8781-4: 2013.

<<Total Light Transmittance>>

The film for a wavelength conversion sheet has a total light transmittance according to JIS K7361-1:1997 of preferably 80% or more, more preferably 85% or more, and further preferably 87% or more.

<Production Method>

The method for producing the film for a wavelength conversion sheet according to the present disclosure is not particularly limited. The following steps 1-1 to 1-3, steps 2-1 to 2-2, or step 3 are each an embodiment of the method for producing the film for a wavelength conversion sheet according to the present disclosure.

Step 1-1: A step of forming a barrier layer on at least one of a first base material film and a second base material film.

Step 1-2: A step of forming a primer layer on the first base material film, provided that when a barrier layer is formed on the first base material film in step 1, a primer layer is formed on an opposite side of the first base material film from the barrier layer.

Step 1-3: A step of laminating an opposite side of the first base material film from the side having the primer layer and the second base material film via an adhesive layer, provided that when a barrier layer is formed on the second base material film in step 1, the lamination is carried out such that the barrier layer is on the first base material film side with respect to the second base material film.

Step 2-1: A step of forming a barrier layer on one surface of the first base material film.

Step 2-2: A step of forming a primer layer on the surface of an opposite side of the first base material film from the surface on which the barrier layer is formed.

Step 3: A step of forming a primer layer on one surface of the first base material film.

<Applications>

The film for a wavelength conversion sheet according to the present disclosure can be used, for example, as a film for a wavelength conversion sheet of a surface light source. Examples of the surface light source include a backlight light source of a liquid crystal display apparatus and a backlight light source of an inspection device. That is, the film for a wavelength conversion sheet according to the present disclosure can be used as a "film for a wavelength conversion sheet of a backlight light source of a liquid crystal display apparatus," a "film for a wavelength conversion sheet of a backlight light source of an inspection device," or the like.

Further, the film for a wavelength conversion sheet according to the present disclosure can also be used as a "film for a wavelength conversion sheet for horticulture." Examples of the wavelength conversion sheet for horticulture include a sheet having the function of converting an ultraviolet ray into a wavelength suitable for plant growth. Examples of the wavelength suitable for plant growth include a wavelength suitable for photosynthesis. The wavelength conversion sheet for horticulture can be installed, for example, on a ceiling or the like of a horticultural facility such as a plastic greenhouse and a glasshouse.

[Wavelength Conversion Sheet]

The wavelength conversion sheet of the present disclosure is a wavelength conversion sheet comprising a first protective film, a quantum dot-containing layer comprising a quantum dot, and a second protective film laminated in presented order, wherein the first protective film and the second protective film are each the film for a wavelength conversion sheet according to the present disclosure described above, the first protective film and the second protective film are laminated such that surfaces of sides of the primer layers thereof face a side of the quantum dot-containing layer, and layers of the first protective film and the second protective film that are in contact with the quantum dot-containing layer are the primer layers, and when a refractive index of the quantum dot-containing layer is defined as $n_0$, $n_0 < n_1$.

FIG. 4 is a cross-sectional view showing one embodiment of the wavelength conversion sheet (200) of the present disclosure. In the wavelength conversion sheet (200) of FIG. 4, a first protective film (100*b*), a quantum dot-containing layer (80) including a quantum dot, and a second protective film (100*a*) are laminated in presented order. In the wavelength conversion sheet (200) of FIG. 4, the first protective film and the second protective film are laminated such that surfaces of sides of the primer layers (10) thereof face a side of the quantum dot-containing layer (80).

In the wavelength conversion sheet as each of the first protective film and the second protective film, the primer layer and the first base material film are preferably the same. When the film for a wavelength conversion sheet further has any one or more layers selected from the group consisting of a barrier layer, a second base material film, and an adhesive layer, these layers are also preferably the same.

The wavelength conversion sheet as each of the first protective film and the second protective film preferably has a vertically symmetrical layer configuration with the quantum dot-containing layer at the center, as shown in FIG. 4. In other words, as the first protective film and the second protective film, a film for a wavelength conversion sheet having the same configuration is preferably used. By having the above configuration, the strain can be evenly dispersed to easily improve the flatness of the wavelength conversion sheet, and the close adhesion of each interface of the wavelength conversion sheet can also be easily improved.

Different films for a wavelength conversion sheet may be used as the first protective film and the second protective film as long as the effect of the present invention is not impaired. For example, a film for a wavelength conversion sheet that has an anti-sticking layer may be used as the first protective film, and a film for a wavelength conversion sheet that does not have an anti-sticking layer may be used as the second protective film. The anti-sticking layer is positioned at a point away from the quantum dot-containing layer. This is because even if one of the first protective film and the second protective film does not have an anti-sticking layer, it is easy to obtain the same effect as that of the vertically symmetrical layer configuration described above.

In the wavelength conversion sheet of the present disclosure, the relationship between the refractive index $n_0$ of the quantum dot-containing layer and the refractive index $n_1$ of the primer layer is $n_0 < n_1$. When the refractive index relationship is as described above, the reflection of light going from the quantum dot-containing layer to the primer layer is fixed end reflection, and the effect by satisfying condition 1 or condition 2 can be exhibited.

<Quantum Dot-Containing Layer>

The quantum dot-containing layer includes a quantum dot and a binder resin.

The quantum dot is a nanometer-sized file particle of a semiconductor, exhibits a specific optical or electrical nature due to the quantum confinement effect (quantum size effect), the effect of confining an electron or an exciton in a small nanometer-sized crystal, and is also referred to as a semiconductor nanoparticle or a semiconductor nanocrystal.

The quantum dot is not particularly limited as long as it is a nanometer-sized fine particle of a semiconductor and is a material that generates the quantum confinement effect (quantum size effect). Examples of the quantum dot include a semiconductor fine particle whose emission color is regulated by its own particle size and a semiconductor fine particle having a dopant.

Quantum dots have different emission colors depending on the particle sizes thereof, and for example, in the case of quantum dots constituted only by a core made of CdSe, the peak wavelengths of fluorescence spectra when the particle sizes are 2.3 nm, 3.0 nm, 3.8 nm, and 4.6 nm are 528 nm, 570 nm, 592 nm, and 637 nm, respectively. That is, the particle size of the quantum dot that emits secondary light having a peak wavelength of 637 nm is 4.6 nm, and the particle size of the quantum dot that emits secondary light having a peak wavelength of 528 nm is 2.3 nm.

The quantum dots preferably include one or more selected from the group consisting of a quantum dot that emits secondary light having a wavelength corresponding to red and a quantum dot that emits secondary light having a wavelength corresponding to green, and more preferably include a quantum dot that emits secondary light having a wavelength corresponding to red and a quantum dot that emits secondary light having a wavelength corresponding to green. The quantum dots may contain a quantum dot other than the quantum dot that emits secondary light having a wavelength corresponding to red or the quantum dot that emits secondary light having a wavelength corresponding to green.

The quantum dot content is appropriately adjusted according to the thickness of the quantum dot-containing layer, the recycling rate of light in the backlight, the target color, or the like. When the thickness of the quantum dot-containing layer is in the range described later, the quantum dot content is preferably 0.010 parts by mass or more and 1.0 part by mass or less per 100 parts by mass of the binder resin of the quantum dot-containing layer.

Specific examples of a material that forms the core of the quantum dot include a semiconductor crystal containing a semiconductor compound or a semiconductor such as a group II-VI semiconductor compound such as MgS, MgSe, MgTe, CaS, CaSe, CaTe, SrS, SrSe, SrTe, BaS, BaSe, BaTe, ZnS, ZnSe, ZnTe, CdS, CdSe, CdTe, HgS, HgSe, and HgTe, a group III-V semiconductor compound such as AlN, AlP, AlAs, AlSb, GaAs, GaP, GaN, GaSb, InN, InAs, InP, InSb, TiN, TiP, TiAs, and TiSb, or a group IV semiconductor such as Si, Ge, and Pb. A semiconductor crystal including a semiconductor compound including three or more elements such as InGaP can also be used.

Further, as a quantum dot composed of a semiconductor fine particle having a dopant, a semiconductor crystal can be used that is formed by doping the above semiconductor compound with a cation of a rare earth metal or a cation of a transition metal, such as $Eu^{3+}$, $Tb^{3+}$, $Ag^+$, or $Cu^+$.

A semiconductor crystal such as CdS, CdSe, CdTe, InP, or InGaP is suitable as a material that forms the core of the quantum dot in view of ease of preparation, controllability of particle size that can provide light emission in the visible range, and fluorescence quantum yield.

The quantum dot may be made of one semiconductor compound or two or more semiconductor compounds, and for example, may have a core-shell type structure having a core made of a semiconductor compound and a shell made of a semiconductor compound different from that of the core.

When the core-shell type quantum dot is used, a material having a bandgap higher than that of the semiconductor compound that forms the core can be used as the semiconductor that forms the shell so that an exciton is confined in the core, whereby the light emission efficiency of the quantum dot can be enhanced.

Examples of the core-shell structure (core/shell) having such a bandgap magnitude relationship include CdSe/ZnS, CdSe/ZnSe, CdSe/CdS, CdTe/CdS, InP/ZnS, Gap/ZnS, Si/ZnS, InN/GaN, InP/CdSSe, InP/ZnSeTe, InGaP/ZnSe, InGaP/ZnS, Si/AlP, InP/ZnSTe, InGaP/ZnSTe, and InGaP/ZnSSe.

The size of the quantum dot may be appropriately controlled by the material that constitutes the quantum dot so that light having a desired wavelength can be obtained. As the particle size of the quantum dot decreases, the energy bandgap increases. Specifically, as the crystal size decreases, the light emission of the quantum dot shifts to the blue side, that is, to the high energy side. Accordingly, by changing the size of the quantum dot, the emission wavelength thereof can be regulated over the entire spectral wavelength region of the ultraviolet region, the visible region, and the infrared region.

In general, the particle size (diameter) of the quantum dot is preferably in the range of 0.5 nm or more and 20 nm or less and preferably in the range of 1 nm or more and 10 nm or less. A narrower size distribution of the quantum dot can provide a clearer emission color.

The shape of the quantum dot is not particularly limited, and may be, for example, a spherical shape, a rod shape, a disk shape, or any other shape. When the quantum dot is not in a spherical shape, the particle size of the quantum dot can be a value of a truly spherical shape having the same volume.

The quantum dot may be coated with a resin.

Examples of the binder resin of the quantum dot-containing layer include a thermoplastic resin, a cured product of a thermosetting resin composition, and a cured product of an ionizing radiation curable resin composition. Among these, in view of durability, a cured product of a thermosetting resin composition and a cured product of an ionizing radiation curable resin composition are preferable, and a cured product of an ionizing radiation curable resin composition is more preferable.

The thermosetting resin composition is a composition including at least a thermosetting resin, and is a resin composition that is cured by heating. The thermosetting resin composition includes preferably a thiol compound and more preferably a polyfunctional thiol compound, which are described later, in addition to the thermosetting resin.

Examples of the thermosetting resin include an acrylic resin, a urethane resin, a phenol resin, a urea melamine resin, an epoxy resin, an unsaturated polyester resin, and a silicone resin. In the thermosetting resin composition, a curing agent is added, as necessary, to these curable resins.

The ionizing radiation curable resin composition is a composition including a compound having an ionizing radiation curable functional group (hereinafter, also referred to as an "ionizing radiation curable compound"). The ionizing radiation curable resin composition includes preferably a thiol compound and more preferably a polyfunctional thiol compound, which are described later, in addition to the ionizing radiation curable compound.

Examples of the ionizing radiation curable functional group include an ethylenically unsaturated bond group such as a (meth)acryloyl group, a vinyl group, or an allyl group, an epoxy group, and an oxetanyl group, and among these, an ethylenically unsaturated bond group is preferable. Among the ethylenically unsaturated bond groups, a (meth)acryloyl group is preferable. Hereinafter, the ionizing radiation curable compound having a (meth)acryloyl group is referred to as a (meth)acrylate-based compound. That is, the binder resin preferably includes a cured product of a composition including a (meth)acrylate-based compound.

As used herein, "(meth)acrylate" refers to methacrylate and acrylate. As used herein, "ionizing radiation" means an electromagnetic wave or a charged particle beam having an energy quantum that can polymerize or crosslink a molecule among electromagnetic waves or a charged particle beams, and usually, an ultraviolet ray (UV) or an electron beam (EB) is used. An electromagnetic wave such as an X-ray or a γ-ray, and a charged particle beam such as an α-ray or an ion beam can also be used.

The ionizing radiation curable compound may be a monofunctional ionizing radiation curable compound having only one such functional group, a polyfunctional ionizing radiation curable compound having two or more such functional groups, or a mixture thereof. Among these, a polyfunctional ionizing radiation curable compound is preferable, and a polyfunctional (meth)acrylate-based compound having two or more (meth)acryloyl groups is more preferable. That is, the binder resin includes preferably a cured product of a polyfunctional ionizing radiation curable compound and more preferably a cured product of a polyfunctional (meth)acrylate-based compound. Further, the binder resin includes preferably a cured product of a composition including a polyfunctional ionizing radiation curable compound and a thiol compound and more preferably a cured product of a composition including a polyfunctional (meth)acrylate-based compound and a thiol compound.

The polyfunctional (meth)acrylate-based compound may have an alkyleneoxy group.

As the alkyleneoxy group, for example, an alkyleneoxy group having 2 or more to 4 or less carbon atoms is preferable, an alkyleneoxy group having 2 or 3 carbon atoms is more preferable, and an alkyleneoxy group having 2 carbon atoms is further preferable.

The polyfunctional (meth)acrylate-based compound having an alkyleneoxy group may be a polyfunctional (meth)acrylate-based compound having a polyalkyleneoxy group including a plurality of alkyleneoxy groups.

When the polyfunctional (meth)acrylate-based compound has an alkyleneoxy group, the number of alkyleneoxy groups in one molecule is preferably 2 or more and 30 or less, and more preferably 2 or more and 20 or less, further preferably 3 or more and 10 or less, and more further preferably 3 or more and 5 or less.

When the polyfunctional (meth)acrylate-based compound has an alkyleneoxy group, the compound preferably has a bisphenol structure. This tends to improve the heat resistance of the cured product. Examples of the bisphenol structure include a bisphenol A structure and a bisphenol F structure, and among these, a bisphenol A structure is preferable.

As the polyfunctional (meth)acrylate-based compound having an alkyleneoxy group, above all, ethoxylated bisphenol A type di(meth)acrylate, propoxylated bisphenol A type di(meth)acrylate, and propoxylated ethoxylated bisphenol A type di(meth)acrylate are preferable, and ethoxylated bisphenol A type di(meth)acrylate is more preferable.

The ionizing radiation curable compound may be a monomer, an oligomer, a low molecular weight polymer, or a mixture thereof.

As described above, the thermosetting resin composition and the ionizing radiation curable resin composition preferably include a thiol compound.

The thiol compound is a compound having one or more units represented by R—SH wherein R is an organic group. As used herein, a compound having one unit represented by R—SH is referred to as a monofunctional thiol compound, and a compound having two or more units represented by R—SH is referred to as a polyfunctional thiol compound.

The thiol compound may be a monofunctional thiol compound, but a polyfunctional thiol compound is preferable in view of improving the strength of the quantum dot-containing layer. Among the polyfunctional thiol compounds, a trifunctional thiol compound or a tetrafunctional thiol compound is more preferable.

The thiol compound causes a thiol-ene reaction of the following equation with a compound having a radically polymerizable functional group in the presence of a radical polymerization initiator. The thiol-ene reaction is preferable in the following: because the thiol-ene reaction can suppress polymerization shrinkage, the stress generated at the time of curing the quantum dot-containing layer is relaxed, and as a result, the interlayer close adhesion of the wavelength conversion sheet is easily further improved. In addition, the cured product obtained by the thiol-ene reaction is preferable in that the heat resistance is easily improved. Further, the refractive index of the thiol compound (about 1.53) is higher than the refractive index of the polyfunctional (meth)acrylate-based compound (about 1.45), and thus the degree of freedom in adjusting the refractive index of the quantum dot-containing layer can be increased.

The following reaction is an example of a reaction between a monofunctional thiol compound and a compound having one radically polymerizable functional group. It is considered that the reaction product of a polyfunctional thiol compound and a compound having two or more radically polymerizable functional groups easily forms a dendrimer structure. Then, it is considered that when the dendrimer structure is formed, the flexibility of the quantum dot-containing layer increases, and that the quantum dot-containing layer itself easily exerts an excellent stress relaxation property. Examples of the radically polymerizable functional group include an ethylenically unsaturated bond-containing group such as a (meth)acryloyl group, a vinyl group, or an allyl group.

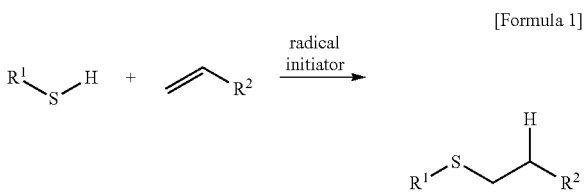

[Formula 1]

wherein $R^1$ and $R^2$ are organic groups.

Specific examples of the monofunctional thiol compound include hexanethiol, 1-heptanethiol, 1-octanethiol, 1-nonanethiol, 1-decanethiol, 3-mercaptopropionic acid, methyl mercaptopropionate, methoxybutyl mercaptopropionate, octyl mercaptopropionate, tridecyl mercaptopropionate, 2-ethylhexyl-3-mercaptopropionate, and n-octyl-3-mercaptopropionate.

Specific examples of the polyfunctional thiol compound include ethylene glycol bis(3-mercaptopropionate), diethylene glycol bis(3-mercaptopropionate), tetraethylene glycol bis(3-mercaptopropionate), 1,2-propylene glycol bis(3-mercaptopropionate), diethylene glycol bis(3-mercaptobutyrate), 1,4-butanediol bis(3-mercaptopropionate), 1,4-butanediol bis(3-mercaptobutyrate), 1,8-octanediol bis(3-mercaptopropionate), 1,8-octanediol bis(3-mercaptobutyrate), hexanediol bisthioglycolate, trimethylolpropane tris(3-mercaptopropionate), trimethylolpropane tris(3-mercaptobutyrate), trimethylolpropane tris(3-mercaptoisobutyrate), trimethylolprop ane tris(2-mercaptoisobutyrate), trimethylolpropane tristhioglycolate, tris-[(3-mercaptopropionyloxy)-ethyl]-isocyanurate, trimethylolethane tris(3-mercaptobutyrate), pentaerythritol tetrakis(3-mercaptopropionate), pentaerythritol tetrakis(3-mercaptobutyrate), pentaerythritol tetrakis(3-mercaptoisobutyrate), pentaerythritol tetrakis(2-mercaptoisobutyrate), dipentaerythritol hexakis(3-mercaptopropionate), dipentaerythritol hexakis (2-mercaptopropionate), dipentaerythritol hexakis(3-mercaptobutyrate), dipentaerythritol hexakis(3-mercaptoisobutyrate), dipentaerythritol hexakis(2-mercaptoisobutyrate), pentaerythritol tetrakisthioglycolate, and dipentaerythritol hexakisthioglycolate.

In the ionizing radiation curable resin composition (or thermosetting resin resin composition), the mass ratio of the ionizing radiation curable compound (or thermosetting resin) and the thiol compound is preferably 80:20 to 35:65 and more preferably 70:30 to 40:60.

When the ionizing radiation curable compound is an ultraviolet curable compound, the ionizing radiation curable composition preferably includes an additive such as a photopolymerization initiator or a photopolymerization accelerator.

The quantum dot-containing layer may include an internal diffusion particle.

As the internal diffusion particle, either of an organic particle and an inorganic particle can be used. Examples of the organic particle include a particle made of polymethyl methacrylate, an acrylic-styrene copolymer, a melamine resin, a polycarbonate, a polystyrene, polyvinyl chloride, a benzoguanamine-melamine-formaldehyde condensate, a silicone resin, a fluororesin, a polyester, or the like. Examples of the inorganic fine particle include a fine particle made of silica, alumina, zirconia, titania, or the like.

Examples of the shape of the internal diffusion particle include a spherical shape, a disk shape, a rugby ball shape, and an irregular shape. The internal diffusion particle may be any of a hollow particle, a porous particle, and a solid particle.

The content of the internal diffusion particle is preferably 1 part by mass or more and 40 parts by mass or less and more preferably 3 parts by mass or more and 30 parts by mass or less per 100 parts by mass of the binder resin.

The average particle size of the internal diffusion particle is preferably 1 μm or more and 7 μm or less and more preferably 1 μm or more and 3 μm or less.

The thickness of the quantum dot-containing layer is preferably 10 μm or more and 200 μm or less, more preferably 20 μm or more and 150 μm or less, and further preferably 30 μm or more and 130 μm or less.

The refractive index $n_0$ of the quantum dot-containing layer is not limited as long as it satisfies the relationship $n_0 < n_1$, and the refractive index no is preferably in the following range.

$n_0$ is preferably 1.40 or more, more preferably 1.43 or more, and further preferably 1.46 or more. $n_0$ is preferably 1.55 or less, more preferably 1.52 or less, and further preferably 1.50 or less.

The refractive index $n_0$ of the quantum dot-containing layer is mostly governed by the refractive index of the binder resin. The reason for this is as follows: the quantum dot-containing layer has a low quantum dot content, and even if an internal diffusion agent is contained, the internal diffusion agent has a particle size larger than the wavelength of light and does not affect the refractive index of the layer.

[Backlight]

The backlight of the present disclosure is a backlight including: at least one light source that emits primary light; an optical plate that is disposed adjacent to the light source and is for light guiding or diffusion; and a wavelength conversion sheet disposed on a light going-out side of the optical plate, wherein the wavelength conversion sheet is the wavelength conversion sheet of the present disclosure described above.

Examples of a backlight 300 of the present disclosure include an edge-lit type backlight 301 as shown in FIG. 5 and a direct-lit type backlight 302 as shown in FIG. 6.

An optical plate 220 used for the edge-lit type backlight 301 in FIG. 5 is an optical member for guiding primary light emitted by a light source 210, and is a so-called light guide plate 221. The light guide plate 221 has, for example, a substantially flat plate shape configured to have at least one surface as a light coming-in surface and one surface substantially orthogonal to the light coming-in surface as a light going-out surface.

The light guide plate is mainly made of a matrix resin selected from the group consisting of a highly transparent resin such as polymethyl methacrylate. A resin particle having a refractive index different from that of the matrix resin may be added, as necessary, to the light guide plate. Each surface of the light guide plate may have a complicated surface shape instead of a uniform flat surface, and may be provided with a dot pattern or the like.

The optical plate 220 used for the direct-lit type backlight 302 of FIG. 6 is an optical member (light diffusing plate 222) having a light diffusing property for making the pattern of the light source 210 less visible. Examples of the light diffusing plate 222 include a milky white resin plate having a thickness of 1 mm or more and 3 mm or less.

In addition to the light source, the optical plate, and the film for a wavelength conversion sheet described above, the edge-lit type and direct-lit type backlights may include one or more members selected from the group consisting of a reflector, a light diffusing film, a prism sheet, a brightness enhancement film (BEF), a reflective polarizing film (DBEF), and the like, depending on the purpose.

The reflector is disposed on the opposite side of the optical plate from the light going-out surface side. The light diffusing film, the prism sheet, the brightness enhancement film, and the reflective polarizing film are disposed on the light going-out surface side of the optical plate. A backlight having an excellent balance of front brightness, viewing angle, and the like can be provided when the backlight is configured to include one or more members selected from the group consisting of a reflector, a light diffusing film, a prism sheet, a brightness enhancement film, a reflective polarizing film, and the like.

In the edge-lit type and direct-lit type backlights, the light source 210 is a light emitting body that emits primary light, and it is preferable to use a light emitting body that emits primary light having a wavelength corresponding to blue. The primary light having a wavelength corresponding to blue preferably has a peak wavelength in the range of 380 nm or more and 480 nm or less. The peak wavelength range is more preferably 450 nm±7 nm, more preferably 450 nm±5 nm, more preferably 450 nm±3 nm, and more preferably 450 nm±1 nm.

The light source 210 is preferably an LED light source and more preferably a blue monochromatic LED light source, in view of simplifying and downsizing the apparatus in which the backlight is installed. The number of the light source 210 is at least one, and it is preferable to provide a plurality thereof in view of emitting sufficient primary light.

In the backlight including the wavelength conversion sheet, the difference in x value (Δx) and the difference in y value (Δy) between before and after the following high temperature and high humidity test in the Yxy color system of the International Commission on Illumination (CIE) are each preferably 0.020 or less and more preferably 0.010 or less. By setting each of Δx and Δy to 0.020 or less, the change in color can be suppressed.

High temperature and high humidity test: A test involving exposure to an atmosphere having a temperature of 60° C. and a relative humidity of 90% for 1000 hours.

The x and y values after the high temperature and high humidity test are measured in an atmosphere having a temperature of 23° C.±5° C. and a relative humidity of 40% or more and 65% or less immediately after the measurement sample is taken out from the environment of the high temperature and high humidity test.

[Liquid Crystal Display Apparatus]

The liquid crystal display apparatus of the present disclosure is a liquid crystal display apparatus including a backlight and a liquid crystal panel, wherein the backlight is the backlight of the present disclosure described above.

The liquid crystal panel is not particularly limited, and a general-purpose liquid crystal panel can be used as the liquid crystal panel of the liquid crystal display apparatus. For example, a liquid crystal panel having a general structure can be used in which the liquid crystal layer is sandwiched between glass plates on the upper side and the lower side, respectively, thereof, specifically, a liquid crystal panel using a display mode such as TN, STN, VA, IPS, and OCB.

The liquid crystal display apparatus further includes a polarizing plate, a color filter, and the like. A general-purpose polarizing plate and color filter can be used.

The display image of the liquid crystal display apparatus is displayed in color by the white light emitted from the backlight penetrating the color filter.

The liquid crystal display apparatus, in which a color filter that matches the spectrum of a backlight using a quantum dot is used, can realize a display that is excellent in brightness and efficiency and produces a very clear color.

EXAMPLES

Next, the present disclosure will be described in more detail with reference to Examples, but the present disclosure is not limited to these Examples at all. "Parts" and "%" are by mass unless otherwise specified.

1. Measurements and Evaluations

The following measurements and evaluations of the films for a wavelength conversion sheet or wavelength conversion sheets of Examples and Comparative Examples were carried out. Results thereof are shown in Table 1 and Table 2.

1-1. Water Vapor Transmission Rate

A value of the water vapor transmission rate according to JIS K7129-2:2019 of each of the films for a wavelength conversion sheet of the Examples and the Comparative Examples was measured. As the measuring apparatus, the trade name "PERMATRAN" manufactured by MOCON, Inc. was used. The temperature and relative humidity conditions for measuring the water vapor transmission rate were 40° C. and 90%. Before measuring the water vapor transmission rate, a sample for measurement was exposed to an atmosphere having a temperature of 23° C.±5° C. and a relative humidity of 40% or more and 65% or less for 30 minutes or more. The water vapor transmission rate thus measured means the water vapor transmission rate in the initial stage. A sample having a water vapor transmission rate of 0.20 g/m$^2$-day or less is at an acceptable level.

1-2. Total Light Transmittance

The total light transmittance of each of the films for a wavelength conversion sheet of the Examples and the Comparative Examples was measured. As the measuring apparatus, a haze meter (HM-150, manufactured by Murakami Color Research Laboratory Co., Ltd.) was used. A sample having a total light transmittance of 85% or more is at an acceptable level.

The total light transmittance was measured in an atmosphere having a temperature of 23° C.±5° C. and a relative humidity of 40% or more and 65% or less. Each sample was exposed to the atmosphere for 30 minutes or more before the measurement. The total light transmittance thus measured means the total light transmittance in the initial stage.

1-3. b* Value

The b* value of the L*a*b* color system of each of the films for a wavelength conversion sheet of the Examples and the Comparative Examples was measured. As the measuring apparatus, a spectrophotometer (trade name: V670) manufactured by JASCO Corporation was used. A sample having a b* value of 1.0 or less is at an acceptable level.

The b* value was measured in an atmosphere having a temperature of 23° C.±5° C. and a relative humidity of 40% or more and 65% or less. Each sample was exposed to the atmosphere for 30 minutes or more before the measurement. The b* value thus measured means the b* value in the initial stage.

1-4. Δx and Δy

<Provision of Direct-Lit Type Backlight for Measurement>

A commercially available liquid crystal display television (manufactured by VIZIO, Inc., PQ65-F1) equipped with a direct-lit type backlight was disassembled, and the direct-lit type backlight was taken out. The direct-lit type backlight is equipped with a direct-lit type blue LED having an emission central wavelength of 450 nm and a full width at half maximum of 20 nm as a light source. In addition, on the light going-out side of the light source, a light diffusing plate, a wavelength conversion sheet including a quantum dot-containing layer, a prism sheet, and a reflective polarizing plate (brightness enhancement film, manufactured by 3M, DBEF (registered trademark)) are disposed in presented order. In addition, a reflective sheet is provided on the opposite side of the light source from the light going-out side.

The wavelength conversion sheet in the direct-lit type backlight was changed to each of the wavelength conversion sheets of the Examples and the Comparative Examples to obtain a "direct-lit type backlight for measurement of an x value and a y value in the initial stage". Each of the wavelength conversion sheets of the Examples and the Comparative Examples was exposed to an atmosphere having a temperature of 23° C.±5° C. and a relative humidity of 40% or more and 65% or less for 30 minutes or more before being incorporated into the direct-lit type backlight.

The wavelength conversion sheet in the direct-lit type backlight was changed to each of the wavelength conversion sheets of the Examples and the Comparative Examples for which a high temperature and high humidity test (a test involving exposure to an atmosphere of a temperature of 60° C. and a relative humidity of 90% for 1000 hours) had been carried out, to obtain a "direct-lit type backlight for measurement of an x value and a y value after the high temperature and high humidity test." The work of incorporating each of the wavelength conversion sheets of the Examples and the Comparative Examples for which the high temperature and high humidity test had been carried out into the direct-lit type backlight was carried out quickly in an atmosphere having a temperature of 23° C.±5° C. and a relative humidity of 40% or more and 65% or less.

Then, the measurement was carried out for the direct-lit type backlight for measurement described above in the following measurement environment.

<x Value and y Value in Initial Stage>

The direct-lit type backlight for measurement of an x value and a y value in the initial stage was turned on, and an x value and a y value of the Yxy color system of the International Commission on Illumination (CIE) were measured from the front direction 500 mm away therefrom in a dark room environment. The measurement atmosphere was at a temperature of 23° C.±5° C. and a relative humidity of 40% or more and 65% or less. Each sample was exposed to the atmosphere for 30 minutes or more before the measurement. As the measuring apparatus, a spectroradiometer (trade name: SR-3AR) manufactured by Topcon Technohouse Corporation was used.

<x Value and y Value after High Temperature and High Humidity Test>

The direct-lit type backlight for measurement of an x value and a y value after the high temperature and high humidity test was turned on, and an x value and a y value of the Yxy color system of the International Commission on Illumination (CIE) were measured from the front direction 500 mm away therefrom in a dark room environment. The measurement atmosphere was at a temperature of 23° C.±5° C. and a relative humidity of 40% or more and 65% or less. As the measuring apparatus, a spectroradiometer (trade name: SR-3AR) manufactured by Topcon Technohouse Corporation was used.

<Δx and Δy>

The difference between the x value in the initial stage and the x value after the high temperature and high humidity test (Δx) and the difference between the y value in the initial stage and the y value after the high temperature and high humidity test (Δy) were calculated.

2. Preparation of Quantum Dot Dispersion Liquid

A quantum dot and amino-modified silicone were mixed at the composition ratio shown below in a glove box purged with nitrogen such that the oxygen concentration was 300 ppm or less, and the resulting mixture was stirred using a magnetic stirrer for 4 hours while heated in a water bath at 90° C. Thereafter, the mixture was filtered through a polypropylene filter having a pore size of 0.2 μm to obtain a CdSe/ZnS core-shell type quantum dot dispersion liquid.

Quantum dot 0.9 parts by mass
(Emission peak: 540 nm, serial number: 748056, manufactured by Sigma-Aldrich Corporation)
Quantum dot 0.9 parts by mass
(Emission peak: 630 nm, serial number: 790206, manufactured by Sigma-Aldrich Corporation)
Amino-modified silicone 99 parts by mass
(Manufactured by Genesee Polymers Corporation, product number: GP-344, viscosity: 670 mPa·s)

3. Preparation of Film for a Wavelength Conversion Sheet and Preparation of Wavelength Conversion Sheet Example 1

Aluminum oxide was vapor-deposited on one surface of a first base material film (biaxially stretched PET film, refractive index $n_2$: 1.636, thickness to: 12 μm) by a vacuum vapor deposition method to form an inorganic oxide layer having a thickness of 10 nm.

Next, the following coating liquid for organic coating layer formation was applied onto the inorganic oxide layer by gravure printing and heat-treated at 180° C. for 60 seconds to form an organic coating layer having a thickness of 400 nm.

Next, the following coating liquid for primer layer formation was applied by gravure printing onto the surface of the opposite side of the first base material film from the surface on which the inorganic oxide layer was formed, and heat-treated at 80° C. for 60 seconds to form a primer layer (refractive index $n_1$: 1.575, thickness $t_1$: 215 nm) to obtain a laminated body A having the primer layer, the first base material film, the inorganic oxide layer, and the organic coating layer in presented order.

Next, a two-pack curing type polyurethane-based adhesive for lamination was applied onto one surface of a second base material film (biaxially stretched PET film, refractive index: 1.636, thickness: 50 μm) by gravure printing and dried to form an adhesive layer having a thickness of 5 μm, thereby obtaining a laminated body B having the adhesive layer on the second base material film.

Next, the surface of the adhesive layer side of the laminated body B was superposed on the surface of the organic coating layer side of the laminated body A, and the laminated body A and the laminated body B were dry-laminated.

Through the above operations, a film for a wavelength conversion sheet according to Example 1 having the primer layer, the first base material film, the inorganic oxide layer, the organic coating layer, the adhesive layer, and the second base material film in presented order was obtained. Two films for a wavelength conversion sheet having the same configuration were prepared.

<Preparation of Coating Liquid for Organic Coating Layer Formation>

Tetraethoxysilane was mixed into a solution (pH 2.2) obtained by mixing water, isopropyl alcohol, and 0.5 N hydrochloric acid, while cooling the same to 10° C., to thereby prepare solution A. Separately, polyvinyl alcohol and isopropyl alcohol having a saponification value of 99% or more were mixed to thereby prepare solution B. Solution A and solution B were mixed to prepare a coating liquid for organic coating layer formation (solid content: 5% by mass). The mass ratio of tetraethoxysilane to polyvinyl alcohol in the coating liquid for organic coating layer formation is 29:4.

<Coating Liquid for Primer Layer Formation>

Polyester polyurethane polyol 50 parts by mass
(Hydroxyl value: 62 mgKOH/g, solid content: 20% by mass)
Silane coupling agent 1 part by mass
(3-Glycidoxypropylmethyldimethoxysilane)
Silica filler 1 part by mass
(Average particle size 5 μm)
Curing agent 1 part by mass
(1,6-Hexamethylene diisocyanate, solid content 35%)
Solvent 50 parts by mass
(Methyl ethyl ketone)

A coating liquid for a quantum dot-containing layer having the following formulation was applied onto the surface of the primer layer side of one of the two films for a wavelength conversion sheet prepared above and dried to form a quantum dot-containing layer not irradiated with ionizing radiation, thereby obtaining a laminated body C.

Next, the laminated body C and the other film for a wavelength conversion sheet were laminated such that the surface of the side of the quantum dot-containing layer not irradiated with ionizing radiation of the laminated body A and the surface of the primer layer side of the other film for a wavelength conversion sheet face each other, and then irradiated with an ultraviolet ray to allow the curing of the ionizing radiation curable resin composition of the quantum dot-containing layer to proceed, thereby obtaining a wavelength conversion sheet of Example 1. The thickness of the quantum dot-containing layer is 100 μm, and the refractive index is 1.48.

The wavelength conversion sheet of Example 1 has the second base material film, the adhesive layer, the organic coating layer, the inorganic oxide layer, the first base material film, the primer layer, the quantum dot-containing layer, the primer layer, the first base material film, the inorganic oxide layer, the organic coating layer, the adhesive layer, and the second base material film in presented order.

<Coating Liquid for Quantum Dot-Containing Layer>
Polyfunctional acrylate-based compound 58.11 parts by mass
(Ethoxylated bisphenol A diacrylate; trade name "ABE-300" of Shin-Nakamura Chemical Co., Ltd.)
Polyfunctional thiol compound 38.74 parts by mass
(Pentaerythritol tetrakis(3-mercaptopropionate); trade name "PEMP" of SC Organic Chemical Co., Ltd.)
Photopolymerization initiator 0.5 parts by mass
(Trade name "Omnirad TPO H" of IGM Resins B.V.)
Quantum dot dispersion liquid prepared in "2" above 1.61 parts by mass
Acetic acid 0.79 parts by mass
Titanium oxide 0.25 parts by mass
(Trade name "Ti-Pure R-706" of The Chemours company; particle size 0.36 μm)

Example 2

Film for a wavelength conversion sheet and wavelength conversion sheet of Example 2 were obtained in the same manner as in Example 1 except that the thickness of the primer layer was changed to the value shown in Table 1.

Example 3

Aluminum oxide was vapor-deposited on one surface of a first base material film (biaxially stretched PET film, refractive index $n_2$: 1.636, thickness to: 50 μm) by a vacuum vapor deposition method to form an inorganic oxide layer having a thickness of 10 nm.

Next, the above coating liquid for organic coating layer formation was applied onto the inorganic oxide layer by gravure printing and heat-treated at 180° C. for 60 seconds to form an organic coating layer having a thickness of 400 nm.

Next, the above coating liquid for primer layer formation was applied by gravure printing onto the surface of the opposite side of the first base material film from the surface on which the inorganic oxide layer was formed, and heat-treated at 80° C. for 60 seconds to form a primer layer (refractive index $n_1$: 1.575, thickness $t_1$: 215 nm).

Through the above steps, a film for a wavelength conversion sheet according to Example 3 having the primer layer, the first base material film, the inorganic oxide layer, and the organic coating layer in presented order was obtained.

Next, a wavelength conversion sheet of Example 3 was obtained in the same manner as in Example 1 except that the film for a wavelength conversion sheet according to Example 1 was changed to the film for a wavelength conversion sheet according to Example 3.

Example 4

A film for a wavelength conversion sheet and a wavelength conversion sheet according to Example 4 were obtained in the same manner as in Example 3 except that the thickness of the primer layer was changed to the value shown in Table 1.

Comparative Examples 1 to 3

Films for a wavelength conversion sheet and wavelength conversion sheets according to Comparative Examples 1 to 3 were obtained in the same manner as in Example 1 except that the thickness of the primer layer was changed to the values shown in Table 1.

TABLE 1

|  | Example 1 | Example 2 | Example 3 | Example 4 | Comparative Example 1 | Comparative Example 2 | Comparative Example 3 |
|---|---|---|---|---|---|---|---|
| Thickness of primer layer [nm] | 215 | 357 | 215 | 357 | 143 | 286 | 429 |
| Relationship between $n_1$ and $n_2$ |  |  | $n_1 < n_2$ |  |  |  |  |
| $d_1$ in expression 1 | 3.01 | 5.00 | 3.01 | 5.00 | 2.00 | 4.00 | 6.01 |
| Thickness of first base material film [μm] | 12 | 12 | 50 | 50 | 12 | 12 | 12 |
| Thickness of second base material film [μm] | 50 | 50 | — | — | 50 | 50 | 50 |
| Water vapor transmission rate [g/m² · day] | 0.15 | 0.15 | 0.15 | 0.15 | 0.15 | 0.15 | 0.15 |
| Total light transmittance [%] | 87.4 | 86.4 | 88.4 | 87.0 | 86.2 | 87.2 | 87.8 |
| b* value | 0.30 | −0.31 | −1.00 | −2.00 | −0.41 | 0.26 | 0.62 |
| Δx | 0.001 | 0.001 | 0.002 | 0.001 | 0.002 | 0.003 | 0.003 |
| Δy | −0.009 | −0.006 | −0.005 | −0.004 | −0.016 | −0.018 | −0.020 |

The films for a wavelength conversion sheet according to Examples 1 to 4 satisfy condition 1. On the other hand, the films for a wavelength conversion sheet according to Comparative Examples 1 to 3 satisfy neither of condition 1 and condition 2.

As is clear from the results in Table 1, it can be confirmed that the films for a wavelength conversion sheet according to Examples 1 to 4 can suppress a change in color with time when applied to a wavelength conversion sheet. On the other hand, it can be confirmed that the films for a wavelength conversion sheet according to Comparative Examples 1 to 3 had larger Δy values than those according to Examples 1 to 4 and cannot suppress a change in color with time when applied to a wavelength conversion sheet.

FIGS. 7 and 8 are diagrams showing the spectral transmittance of the films for a wavelength conversion sheet according to Examples 1 and 2, respectively, and FIGS. 9 to 11 are diagrams showing the spectral transmittance of the films for a wavelength conversion sheet of Comparative Examples 1 to 3, respectively. As can be seen from FIGS. 7 and 8, the spectral transmittance of the films for a wavelength conversion sheet according to Examples 1 and 2 show a peak in the vicinity of a wavelength of 450 nm. On the other hand, as can be seen from FIGS. 9 to 11, the spectral transmittance of the films for a wavelength conversion sheet according to Comparative Examples 1 to 3 has no peak in the vicinity of a wavelength of 450 nm. It is considered that the film for a wavelength conversion sheet according to each of Examples 1 and 2, which satisfy condition 1, can show a spectral transmittance peak in the vicinity of a wavelength of 450 nm, and thus can suppress a change in color with time when applied to a wavelength conversion sheet. As is the case with Examples 1 and 2, the spectral transmittance of the films for wavelength conversion sheets according to Examples 3 and 4 also shows a peak in the vicinity of a wavelength of 450 nm (not shown).

Example 5

Silicon oxide was vapor-deposited on one surface of a first base material film (biaxially stretched PET film, refractive index $n_2$: 1.636, thickness to: 50 μm) by a vacuum vapor deposition method to form an inorganic oxide layer having a thickness of 20 nm.

Next, the above coating liquid for organic coating layer formation was applied onto the inorganic oxide layer by gravure printing and heat-treated at 180° C. for 60 seconds to form an organic coating layer having a thickness of 400 nm.

Next, the above coating liquid for primer layer formation was applied by gravure printing onto the surface of the opposite side of the first base material film from the surface on which the inorganic oxide layer was formed, and heat-treated at 80° C. for 60 seconds to form a primer layer (refractive index $n_1$: 1.575, thickness $t_1$: 500 nm).

Through the above steps, a film for a wavelength conversion sheet according to Example 5 having the primer layer, the first base material film, the inorganic oxide layer, and the organic coating layer in presented order was obtained.

Next, a wavelength conversion sheet of Example 5 was obtained in the same manner as in Example 1 except that the film for a wavelength conversion sheet according to Example 1 was changed to the film for a wavelength conversion sheet according to Example 5.

Comparative Example 4

A film for a wavelength conversion sheet and a wavelength conversion sheet according to Comparative Example 4 were obtained in the same manner as in Example 5 except that the thickness of the primer layer was changed to the value shown in Table 2.

TABLE 2

|  | Example 5 | Comparative Example 4 |
|---|---|---|
| Thickness of primer layer [nm] | 500 | 429 |
| Relationship between $n_1$ and $n_2$ | $n_1 < n_2$ | |
| $d_1$ in expression 1 | 7.00 | 6.01 |
| Material of inorganic oxide layer | Silicon oxide | |
| Thickness of first base material film [μm] | 50 | 50 |
| Thickness of second base material film [μm] | — | — |
| Water vapor transmission rate [g/m² · day] | 0.2 | 0.2 |
| Total light transmittance [%] | 85.6 | 86.4 |
| b* value | 1.00 | 2.30 |
| Δx | 0.011 | −0.016 |
| Δy | −0.020 | −0.031 |

The film for a wavelength conversion sheet according to Example 5 satisfies condition 1. On the other hand, the film for a wavelength conversion sheet according to Comparative Example 4 satisfies neither of condition 1 and condition 2.

As is clear from the results in Table 2, it can be confirmed that the film for a wavelength conversion sheet according to Example 5 can suppress a change in color with time when applied to a wavelength conversion sheet, as compared with the film for a wavelength conversion sheet according to Comparative Example 4.

REFERENCE SIGNS LIST

10: Primer layer
20: First base material film
30: Barrier layer
30A: First barrier layer
30B: Second barrier layer
40: Second base material film
50: Adhesive layer
80: Quantum dot-containing layer
100, 100a, 100b: Film for a wavelength conversion sheet
100a: Second protective film
100b: First protective film
200: Wavelength conversion sheet
210: Light source
220: Optical plate
221: Light guide plate
222: Diffusing plate
230: Reflector
240: Prism sheet
300: Backlight
301: Edge-lit type backlight
302: Direct-lit type backlight

The invention claimed is:

1. A film for a wavelength conversion sheet, comprising a primer layer and a first base material film in presented order, wherein
a refractive index of the primer layer is defined as $n_1$, a thickness of the primer layer is defined as $t_1$, and a refractive index of the first base material film is defined as $n_2$, and
the following condition 1 or the following condition 2 is satisfied:
Condition 1: $n_1 < n_2$, and $d_1$ represented by the following expression 1 represents a range of $x \pm 0.10$ wherein x is an odd integer;

Condition 2: $n_1 > n_2$, and $d_1$ represented by the following expression 1 represents a range of x±0.10 wherein x is an even integer;

$$d_1 = n_1 \times t_1 / 112.5 \text{ nm} \quad \text{Expression 1.}$$

2. The film for a wavelength conversion sheet according to claim 1, wherein the film comprises the primer layer, the first base material film, and a barrier layer in presented order.

3. The film for a wavelength conversion sheet according to claim 2, wherein the barrier layer comprises an inorganic oxide layer and an organic coating layer.

4. The film for a wavelength conversion sheet according to claim 2, wherein the barrier layer comprises a first inorganic oxide layer, a first organic coating layer, and a second inorganic oxide layer in presented order from a side of the first base material film.

5. The film for a wavelength conversion sheet according to claim 2, wherein the barrier layer comprises a first inorganic oxide layer, a first organic coating layer, a second inorganic oxide layer, and a second organic coating layer in presented order from a side of the first base material film.

6. The film for a wavelength conversion sheet according to claim 1, wherein the film comprises the primer layer, the first base material film, a barrier layer, and a second base material film in presented order.

7. The film for a wavelength conversion sheet according to claim 6, wherein a thickness of the second base material film is 10 μm or more and 200 μm or less.

8. The film for a wavelength conversion sheet according to claim 6, wherein a thickness of the second base material film is 10 μm or more and 65 μm or less.

9. The film for a wavelength conversion sheet according to claim 6, wherein a thickness of the second base material film/a thickness of the first base material film is 2.50 or more and 6.50 or less.

10. The film for a wavelength conversion sheet according to claim 6, wherein a thickness of the second base material film/a thickness of the first base material film is 2.50 or more and 4.20 or less.

11. The film for a wavelength conversion sheet according to claim 6, wherein the film comprises an anti-sticking layer on an opposite side of the second base material film from the barrier layer.

12. The film for a wavelength conversion sheet according to claim 1, wherein in the condition 1, $d_1$ represented by the expression 1 represents a range of x±0.10 wherein x is an odd integer of 3 or more and 5 or less, and in the condition 2, $d_1$ represented by the expression 1 represents a range of x±0.10 wherein x is an even integer of 2 or more and 4 or less.

13. The film for a wavelength conversion sheet according to claim 1, wherein in the condition 1, $d_1$ represented by the expression 1 represents a range of x±0.10 wherein x is 3, and in the condition 2, $d_1$ represented by the expression 1 represents a range of x±0.10 wherein x is 2.

14. The film for a wavelength conversion sheet according to claim 1, wherein the thickness of the primer layer, $t_1$, is 100 nm or more and 900 nm or less.

15. The film for a wavelength conversion sheet according to claim 1, wherein the thickness of the primer layer, $t_1$, is 100 nm or more and 270 nm or less.

16. The film for a wavelength conversion sheet according to claim 1, wherein a thickness of the first base material film is 5 μm or more.

17. A wavelength conversion sheet comprising a first protective film, a quantum dot-containing layer comprising a quantum dot, and a second protective film laminated in presented order, wherein the first protective film and the second protective film are each the film for a wavelength conversion sheet according to claim 1, the first protective film and the second protective film are laminated such that surfaces of sides of the primer layers thereof face a side of the quantum dot-containing layer, and layers of the first protective film and the second protective film that are in contact with the quantum dot-containing layer are the primer layers, and when a refractive index of the quantum dot-containing layer is defined as $n_0$, $n_0 < n_1$.

18. A backlight comprising: at least one light source that emits primary light; an optical plate that is disposed adjacent to the light source and is for light guiding or diffusion; and a wavelength conversion sheet disposed on a light going-out side of the optical plate, wherein the wavelength conversion sheet is the wavelength conversion sheet according to claim 17.

19. A liquid crystal display apparatus comprising: a backlight; and a liquid crystal panel, wherein the backlight is the backlight according to claim 18.

* * * * *